US011526704B2

(12) United States Patent
Guo et al.

(10) Patent No.: US 11,526,704 B2
(45) Date of Patent: Dec. 13, 2022

(54) METHOD AND SYSTEM OF NEURAL NETWORK OBJECT RECOGNITION FOR IMAGE PROCESSING

(71) Applicant: Intel Corporation, Santa Clara, CA (US)

(72) Inventors: Ping Guo, Beijing (CN); Lidan Zhang, Beijing (CN); Haibing Ren, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 17/053,720

(22) PCT Filed: Oct. 26, 2018

(86) PCT No.: PCT/CN2018/112233
§ 371 (c)(1),
(2) Date: Nov. 6, 2020

(87) PCT Pub. No.: WO2020/082382
PCT Pub. Date: Apr. 30, 2020

(65) Prior Publication Data
US 2021/0248427 A1 Aug. 12, 2021

(51) Int. Cl.
G06K 9/62 (2022.01)
G06V 10/50 (2022.01)
G06V 10/56 (2022.01)
G06V 20/40 (2022.01)

(52) U.S. Cl.
CPC ......... *G06K 9/6267* (2013.01); *G06K 9/6256* (2013.01); *G06K 9/6262* (2013.01); *G06V 10/50* (2022.01); *G06V 10/56* (2022.01); *G06V 20/40* (2022.01)

(58) Field of Classification Search
CPC .. G06K 9/6267; G06K 9/6256; G06K 9/6262; G06V 10/56; G06V 20/40; G06V 10/50
See application file for complete search history.

(56) References Cited

U.S. PATENT DOCUMENTS

| 10,217,028 | B1* | 2/2019 | Wang | G06T 7/20 |
| 10,713,794 | B1* | 7/2020 | He | G06V 10/764 |
| 10,860,919 | B2* | 12/2020 | Kanazawa | G06N 3/084 |
| 11,074,504 | B2* | 7/2021 | Chen | G06N 3/084 |
| 11,200,678 | B2* | 12/2021 | Takeda | G06V 20/20 |
| 2008/0013837 | A1 | 1/2008 | Porter et al. | |

(Continued)

FOREIGN PATENT DOCUMENTS

| CN | 105957105 | 9/2016 |
| CN | 106709936 | 5/2017 |

OTHER PUBLICATIONS

International Search Report and Written Opinion for PCT Application No. PCT/CN2018/112233, dated Jul. 25, 2019.

(Continued)

*Primary Examiner* — Utpal D Shah
(74) *Attorney, Agent, or Firm* — Essential Patents Group, LLP.

(57) ABSTRACT

A system, article, and method of neural network object recognition for image processing includes customizing a training database and adapting an instance segmentation neural network used to perform the customization.

25 Claims, 12 Drawing Sheets

(56) References Cited

U.S. PATENT DOCUMENTS

| | | | | |
|---|---|---|---|---|
| 2017/0109625 | A1* | 4/2017 | Dai | G06K 9/6273 |
| 2017/0148223 | A1* | 5/2017 | Holzer | G06V 20/10 |
| 2018/0089497 | A1 | 3/2018 | Romanenko et al. | |
| 2018/0250826 | A1* | 9/2018 | Jiang | G06V 10/764 |
| 2019/0130229 | A1* | 5/2019 | Lu | G06V 10/462 |
| 2019/0311202 | A1* | 10/2019 | Lee | G06T 9/002 |
| 2019/0332118 | A1* | 10/2019 | Wang | G06T 7/194 |
| 2020/0012895 | A1* | 1/2020 | Zhao | G06N 3/0454 |
| 2020/0074642 | A1* | 3/2020 | Wilson | G06T 7/174 |
| 2020/0167943 | A1* | 5/2020 | Kim | G06K 9/6267 |

OTHER PUBLICATIONS

Caelles, S. et al., "One-shot video object segmentation", CVPR 2017.

Caelles, S. et al., "The 2018 DAVIS Challenge on Video Object Segmentation", arXiv preprint arXiv:1803.00557 (2018).

Khoreva, et al., "Lucid Data Dreaming for Object Tracking", CVPR workshop, 2017.

Krahenbuhl, P. et al., "Efficient inference in fully connected CRFs with gaussian edge potentials", Advances in neural information processing systems, pp. 109-117 (2011).

Li, Fei-Fei et al., "Analysis of Large-Scale Visual Recognition", Bay Area Vision Meeting (2013).

Lin, T.Y. et al., "Microsoft COCO: Common Objects in Context", ECCV (2017).

Redmon, J. et al., "Yolov3: An incremental Improvement", arXiv (2018).

Russakovsky, O. et al., "Large Scale Visual Recognition Challenge", airXiv: 1409.0575v3 (2013).

Uijlings, J.R.R. et al., "Selective Search for Object Recognition", International Journal of Computer Vision, technical report (2012).

Van De Sande, et al., "Segmentation as Selective Search for Object Recognition", International Journal of Computer Vision, vol. 104 (2), pp. 154-171 (2013).

Voigtlaender, P. et al., "Online adaptation of convolutional neural networks for video object segmentation", BMVC 2017.

International Preliminary Report on Patentability for PCT Application No. PCT/CN2018/112233, dated May 6, 2021.

* cited by examiner

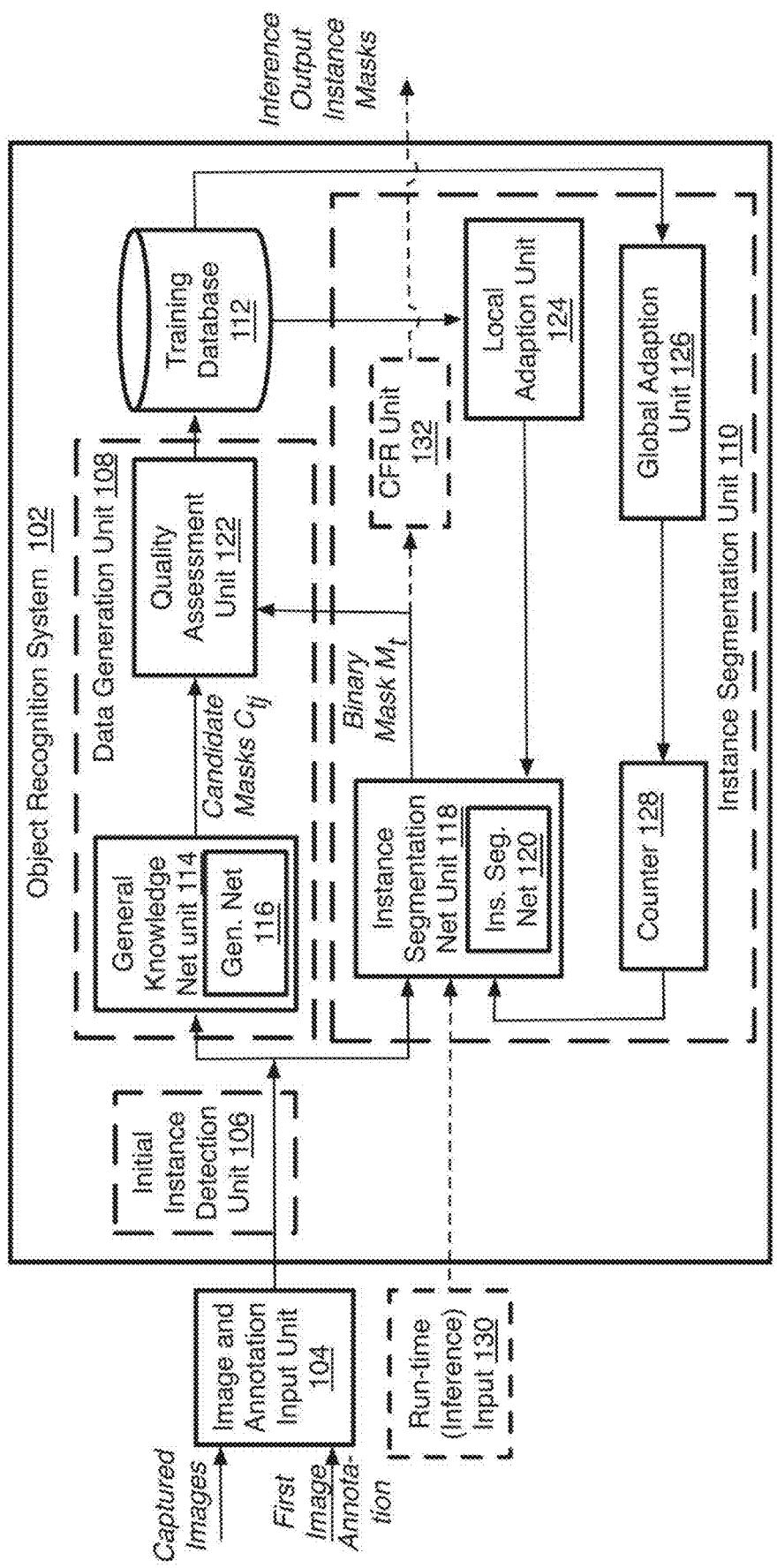

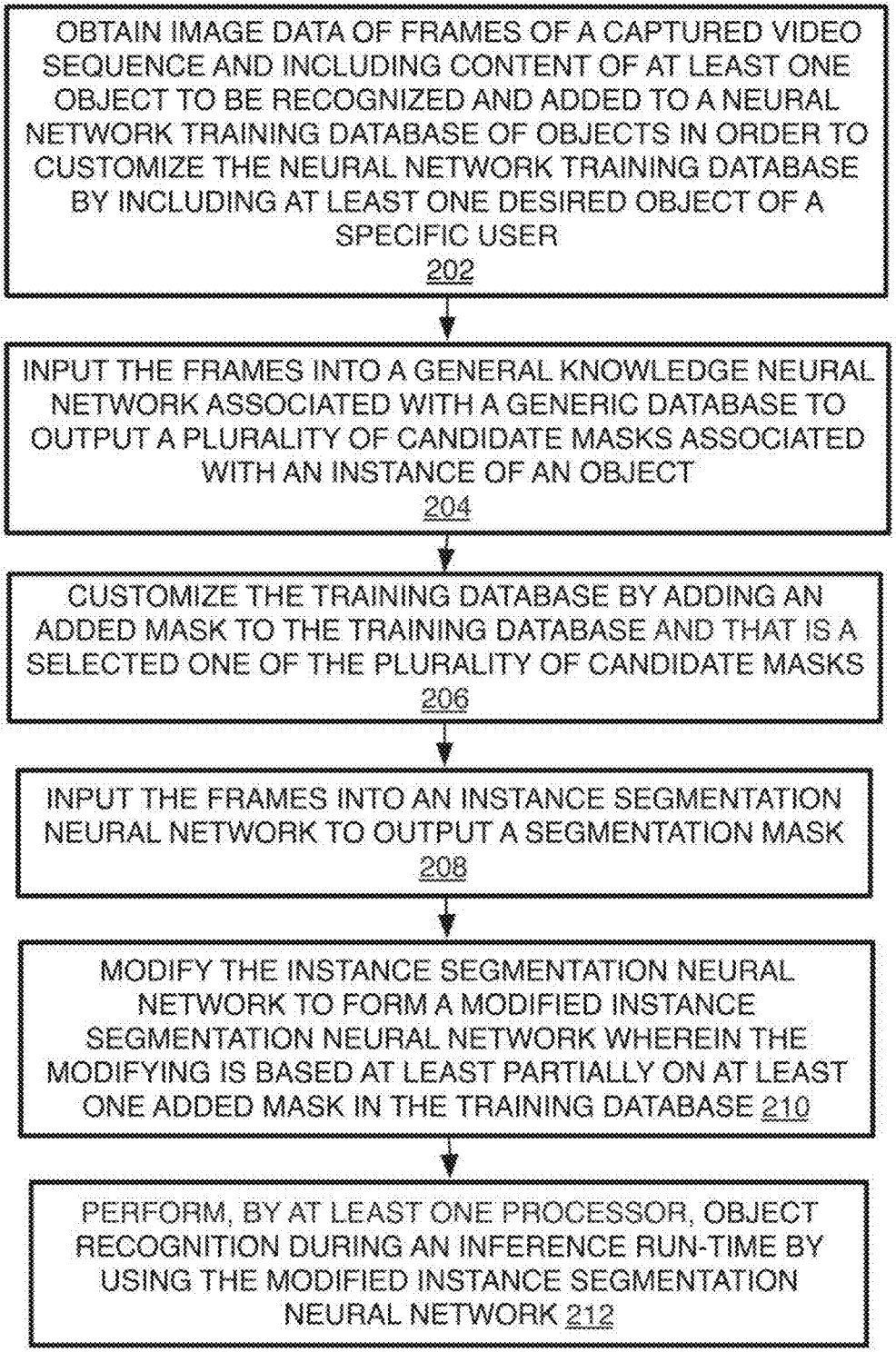

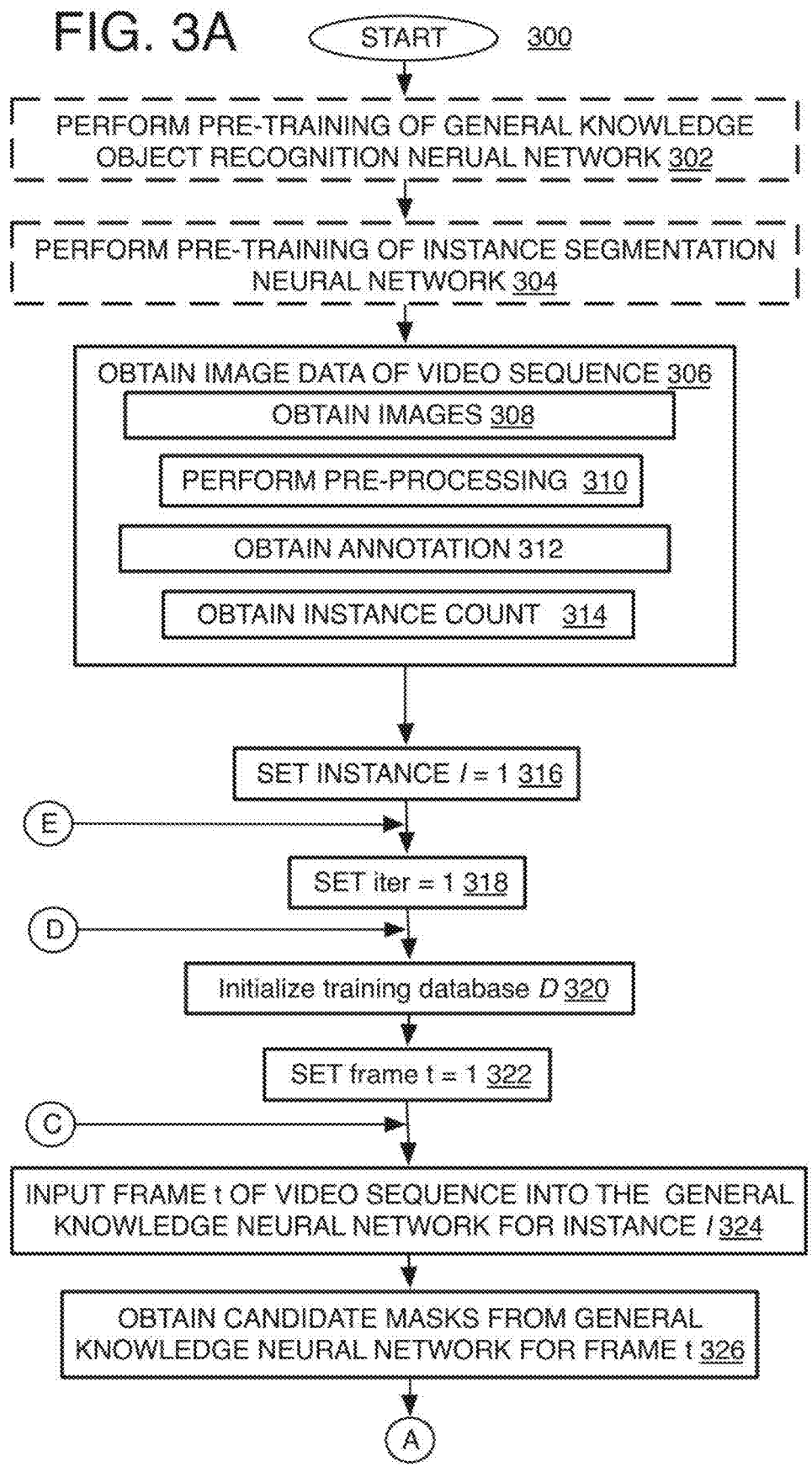

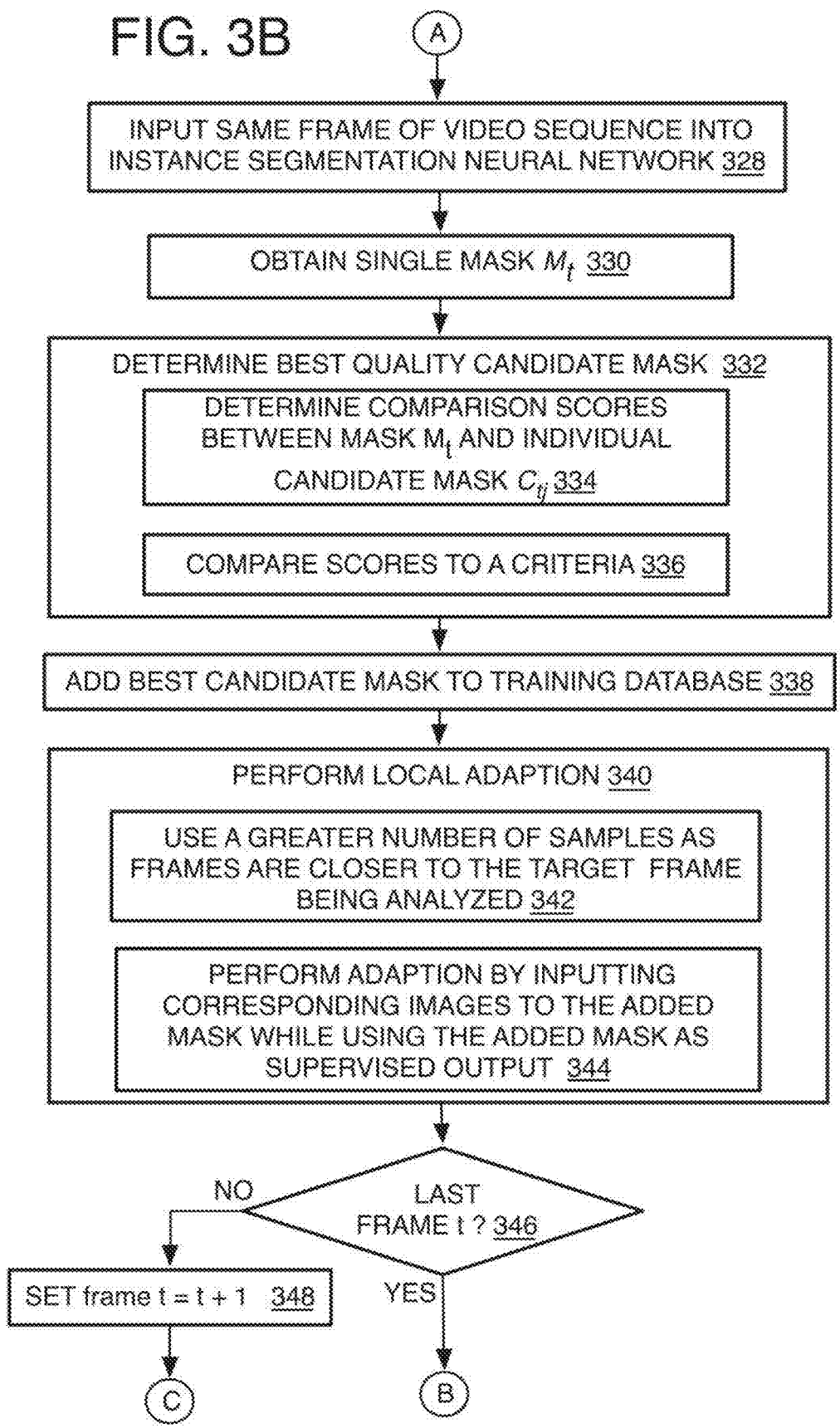

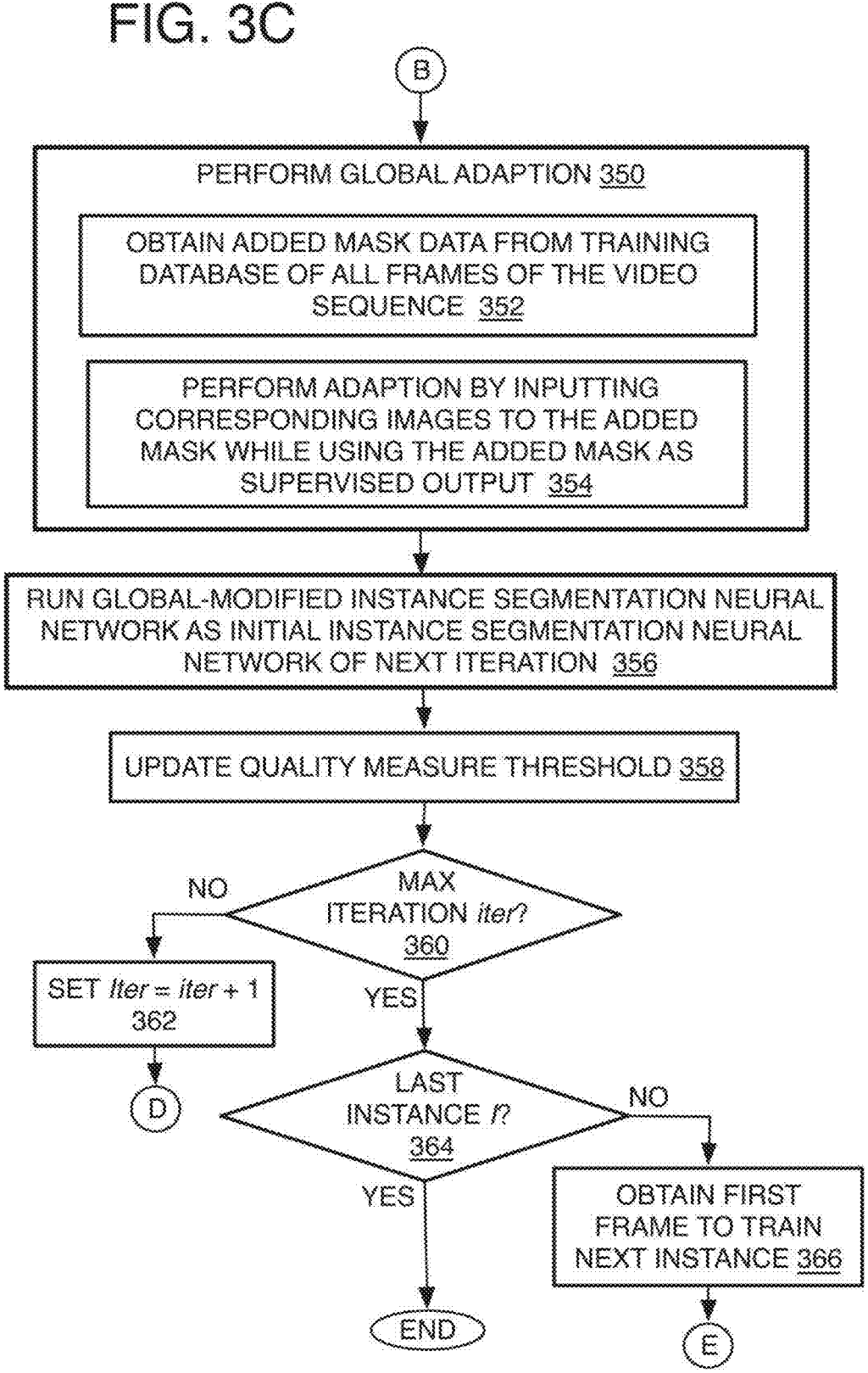

METHOD AND SYSTEM OF NEURAL NETWORK OBJECT RECOGNITION FOR IMAGE PROCESSING

CLAIM OF PRIORITY

This Application is a National Stage Entry of, and claims priority to, PCT Application No. PCT/CN2018/112233, filed on 26 Oct. 2018 and titled "METHOD AND SYSTEM OF NEURAL NETWORK OBJECT RECOGNITION FOR IMAGE PROCESSING", which is incorporated by reference in its entirety for all purposes.

BACKGROUND

Computer-vision provides computers or automated machines with visual abilities. Thus, it is desirable in computer-vision to provide such systems with the ability to reason about the physical world by being able to understand what is being seen in 3D and from images captured by cameras for example. In other words, applications in robotics, virtual-reality (VR), augmented-reality (AR), and merged reality (MR) may need to understand the world around the robot or person providing the point of view in the applications. For example, a robot needs to understand what it sees in order to manipulate (grasp, move, etc.) objects. VR, AR, or MR applications need to understand the world around the person providing the point of view so that when the person moves in such a world, the person is shown to avoid obstacles in that world for example. This ability also permits such computer vision systems to add semantically plausible virtual objects to the world environment. Tus, a system that understands it is seeing a lamp, can understand the purpose and operation of the lamp. Other computer vision applications also use such semantic object recognition such as video editing, self-driving vehicles, smart homes, security systems, and so forth.

For these purposes, many semantic object recognition techniques that include object classification, detection, and segmentation are now based on neural networks. Many conventional neural network object recognition techniques, however, are trained on datasets that are too small relative to the number of potential objects in the world, and therefore often are missing desired objects. Yet the network datasets also are often so large that it is expensive and time consuming to train the neural networks. This is made worse when such neural networks typically are not adaptable to add desired target objects to the neural network database for a particular user.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram of an image processing device according to at least one of the implementations herein;

FIG. 2 is a flow chart of a method of object recognition for image processing in accordance with at least one of the implementations herein;

FIGS. 3A-3C is a detailed flow chart of a method of recognition for image processing in accordance with at least one of the implementations herein;

DETAILED DESCRIPTION

Figure 4:
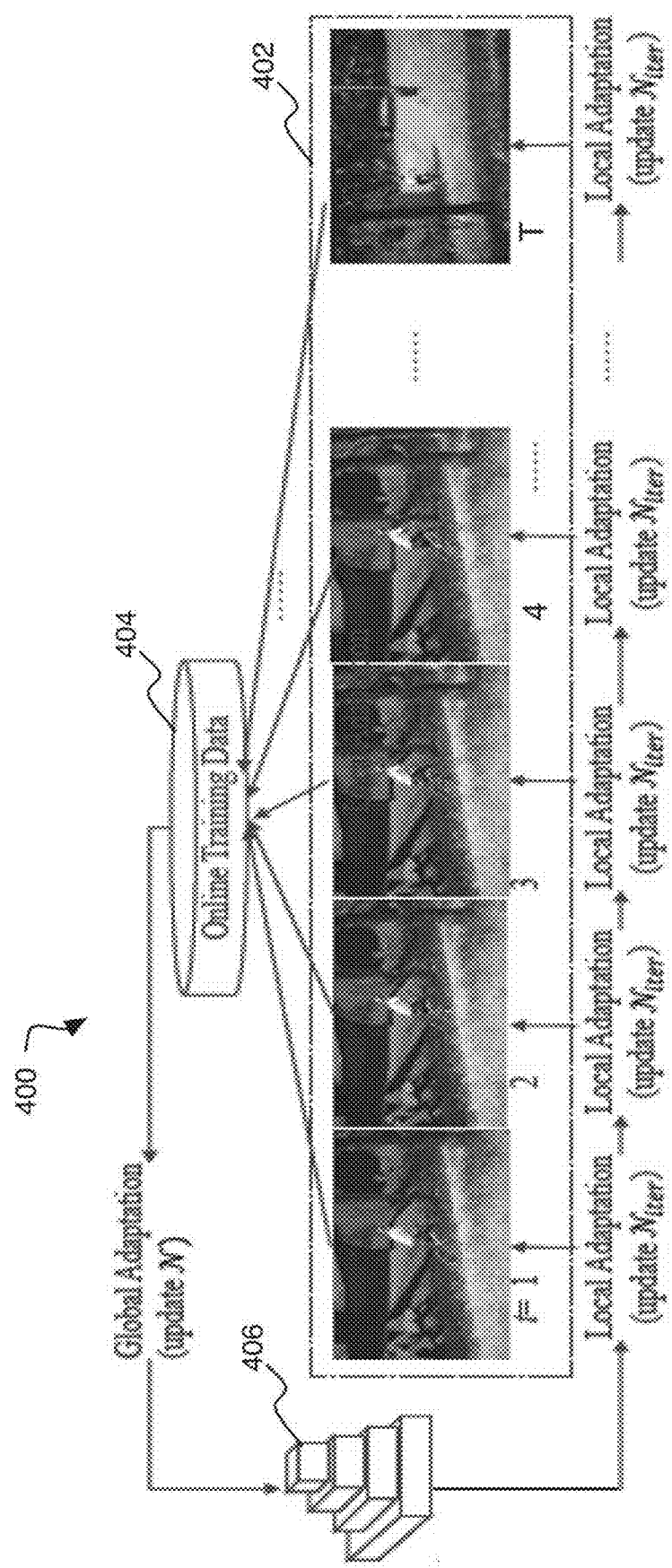
FIG. 4 is a schematic flow diagram of local and global neural network adaption for object segmentation according to at least one of the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices, commercial devices, and/or consumer electronic (CE) devices such as imaging devices, digital cameras, smart phones, webcams, video game panels or consoles, set top boxes, tablets, and so forth which may or may not be used for computer vision tasks, and any of which may have light projectors and/or sensors for performing object detection, depth measurement, and other tasks, and may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide neural network object recognition for imaging processing.

As mentioned, computer-vision often is used to reason about the physical world. Applications in robotics, virtual-reality (VR), augmented-reality (AR), merged reality (MR), and other computer vision automated applications may need to understand the world around the camera sensor, whether the camera sensor is on a robot, mounted for point of view (POV) of a user, or mounted on other devices such as self-driving vehicles. For example, these systems may need to understand what it sees in order to manipulate (grasp, move, etc.) objects. VR/AR/MR applications may need to understand the world in order to avoid obstacles as the user moves, and add semantically plausible virtual objects to the environment. Otherwise, semantic object recognition may be used for many different applications that require identification of objects within an image.

To perform these tasks, many machine learning techniques are being used such as deep learning based methods that train neural networks to perform computer vision tasks for object recognition such as object classification, object detection, spatial object segmentation, and semantic object segmentation (or recognition). Object recognition techniques may include a number of these operations that often overlap or are combined to be performed by a single algorithm or neural network technique.

The conventional object recognition techniques have a number of disadvantages. First, many conventional deep learning nets are trained on pre-defined datasets with a fixed number of object types. It is currently impossible to build a dataset with all objects in the world, and thus, it is hard to train a generic net to contain everything. For instance, a mask regional convolutional neural network (Mask R-CNN) detects and segments 80 classes, and the Yolo9000 detects 9000 objects. Although 9000 is a large number for current datasets and classifiers, it is still a relatively small number compared to millions of object types in the world. Thus, by one perspective, the training databases for the conventional object recognition neural networks are one too small.

Also, some techniques are referred to as one-shot video object recognition and segmentation, which is used for small datasets and user defined object understanding scenarios. In this technique, a user may request any object in images to be recognized and segmented. The one shot techniques often are trained by using a single annotated frame that semantically labels objects in a video sequence of frames. The one shot neural network technique, however, is easily overfitted due to the mere single annotated frame and cannot handle object variations of objects in its dataset in terms of appearance, shape, and so forth. Also, the one shot techniques are limited since these techniques cannot handle new scenes including new objects and new backgrounds it has not already experienced.

Second, by another perspective, the neural network training databases of the conventional object recognition and segmentation techniques are too large. Particularly, the performance of deep learning techniques heavily depend on a large amount of training data with careful annotations as mentioned. In many applications, the objects of interest vary from task to task, and a neural network must be trained to handle all of the tasks. Thus, it can be very expensive and time consuming, and therefore impractical, to build individual datasets for each individual task by training a generic neural network for each specific task for example.

Third, the conventional neural network object recognition and segmentation techniques are not adaptable. A user's desire for certain object types are always changing. As an example in the elder care field, an elderly person may use a robot with computer vision to assist with identifying or even dispensing medication. These systems typically do not have any way for the user to add images of a new medication bottle type (new bottle shape and printed label on the bottle) to the neural network database when such action is desired.

A number of conventional techniques attempt to resolve these issues. This includes OSVOS (One-Shot Video Object Segmentation) (see Caelles. S., et al., "One-shot video object segmentation", CVPR (2017)). OSVOS uses a semi-supervised method for video object segmentation. For each video, only the first frame is annotated. This conventional technique pre-trains a segmentation neural network on large datasets, and then fine-tunes the neural network on the given one annotation. This method can work fine on simple videos, but is prone to overfitting on the beginning annotated frames, and therefore cannot handle large variations or deformations of objects in the foreground nor significant changes on the background. Also this technique does not provide a way for the user to customize and grow the capability of the network.

A one shot segmentation technique that uses augmented data to fine tune a deep neural network is lucid data dreaming (see Khoreva et al., "Lucid Data Dreaming for Object Tracking", CVPR workshop, (2017)), which synthesizes training data by simulating foreground and background changes in illumination, deformation, motion, and so forth, and then synthesizes new data for training. This is accomplished by in-painting on a dynamic background. However, the transformation in this technique is relatively limited because this technique cannot adequately segment a large variation of both foreground and background objects that have not already been included in the neural network training database (referred to herein as objects that have not been experienced). Large deformations are difficult to simulate, and the unknown, new objects are hard to predict. Thus the method is not robust towards large appearance changes, especially on the background. Also, Lucid Data Dreaming does not provide a user with the capability to customize and grow the neural network training database either.

Another technique does perform automatic growth of a neural network training database, but the data that is added is unreliable. Specifically, Online Adaptive Video Object Segmentation (OnAVOS) (see Voigtlaender. P., et al., "Online adaptation of convolutional neural networks for video object segmentation", BMVC (2017)) is an updated online adaption version of the OSVOS database by using its own output in the form of a self-loop schema to add foreground variations to the training database. By using more training data, the performance was improved slightly for appearance changes, but there is no way to determine the accuracy of the added training data. Inaccurate labels may induce artifacts and segmentation errors can accumulate as a video is being analyzed and the training data evolves. Thus, artifacts are likely to be undesirably taken in for training the database as positive samples, and the artifacts can then spread throughout the training iterations as the video is being analyzed.

To resolve these issues, a one-shot, semi-supervised system and method of object recognition and segmentation disclosed herein that operates efficiently on small training datasets, and that can be easily customized by a user to add new desired objects of interest. The disclosed method collects and accumulates training data as an input video is being analyzed instance by instance and frame by frame for training of a neural network training database that itself automatically generates reliable annotations for training of an instance segmentation neural network during a customization setup mode. An instance segmentation neural network is a semantic segmentation neural network that normally provides a segmentation mask for a single instance, one instance at a time, and here which may be a user defined instance. The instance segmentation neural network provides fine (versus coarse) pixel level boundaries and one semantic recognition label during a run-time or inference mode. During the customization setup mode described here, however, the semantic recognition is not needed yet since the label of the instance is already known during the customization setup mode as explained below.

Herein, the instance segmentation neural network is adapted to each frame by fine-tuning "itself". This is accomplished by providing three particular features during a customization setup mode. First, a user is able to add desired objects of interest to a neural network training database, second a general knowledge (or generic) neural network is used to provide candidate masks, and third, the instance segmentation neural network is trained on the database using local and global neural network adaption techniques. During the customization mode, the instance segmentation neural network provides segmentation masks, which may be binary masks, to be compared to the candidate masks to determine the quality of the candidate masks for selection and addition to the training database. Once trained, the instance segmentation neural network is used during run-time (or inference) to provide annotated output masks that is the result of semantic object recognition.

More particularly, a user customized object segmentation solution or customization setup mode is proposed where the end-user of an image capture device and image processing system such as a smartphone for example can define his/her own objects of interest by providing only one annotation per object on a first frame of a video sequence of the object(s). No matter the object desired by the user, the present method merely needs one of the frames of the input video sequence to be annotated (or initial mask provided) to automatically generate corresponding training data and adapt an instance segmentation neural network to the object variations. The user does not need to manually build an overly large pre-defined and fixed training dataset for the desired object and for the customization training. This customization setup mode is conveniently performed by the end user to customize a neural network training database with objects to recognize as desired by the end user. This is performed by the user after default pre-training of the neural networks by the manufacturer for example, but before actual use (or run-time or inference) to recognize those desired objects. The customization setup mode also may be referred to as a network fine-tuning mode.

Such system and method also includes the operation of a general knowledge or generic neural network to provide candidate masks of the user's desired objects. Thus, such a network receives the user's video sequence with the first annotated frame as an input. The general knowledge net is then used to provide reliable and automatic generation of neural network training data. The general knowledge net generates possible training data in the form of the candidate masks and which is robust towards appearance changes, large transformations, occlusions, and so forth. A quality measurement is then determined to select only qualified data for training by selecting the candidate mask that passes some criteria.

During pre-training, the general knowledge neural network is based on one or more large generic datasets and is re-trained or fine-tuned in a class-insensitive way to adapt a general neural network training database to any object type. Since one (or some other selected low number) of frames are annotated on an input video sequence, and therefore to avoid overfitting, the target objects on the input annotated frame(s) are augmented (or varied) to form many training frames for each object. Also, the general knowledge neural network is fine-tuned by limiting the augmented data to a small portion of the neural network by layer and/or epochs (where an epoch is a single pass of all training data through the network). As a result, the general knowledge net will be able to identify the desired objects of interest, but it also will be able to detect and segment other new objects.

Different from traditional deep neural networks with fixed capability after training, the instance segmentation neural network here grows in capability with data accumulated and added to the neural network training database based on a two level network adaptation strategy. The instance segmentation neural network is automatically updated gradually (or in other words, in a frame by frame manner) during the customization fine-tuning mode, and adapted to new scenes and object variations in both foreground and background. This is accomplished by using both a local adaption technique that emphasizes training samples from nearby frames (versus farther frames temporally along the video sequence) for the training based on a current frame, and a global adaption that uses samples from all or substantially all frames of a video sequence. Specifically, in local network adaptation, the instance segmentation net is fine-tuned on mainly nearby frames in order to gain good performance on the next frame, which is immediately beneficial so that the method selects good candidate masks during the quality measurement phase. In global network adaptation, the instance segmentation neural network is fine-tuned on all generated data (all frames analyzed for an instance and for a video sequence) in order to be adaptable to different variations. This may include using some of the same samples from the training database that were used by the local adaption so that multiple epochs of the same object may be used to perform the training. This results in training of object variations by utilizing all training data, thereby increasing the accuracy of the neural network.

Thus, it can be stated that the present method iterates between a neural network adaptation operation and a data generation operation to provide better quality (more accuracy) on a larger variety of objects compared to conventional methods. By accumulating training data in a customization mode using the proposed method, the instance segmentation neural network is fine-tuned on this data to improve performance, and is directed to emphasize segmentation of the target object(s) by training on the accumulated data of the object. The use of the instance segmentation net in conjunction with the general knowledge (generic) neural network as described above (rather than the generic neural network alone) has much less false alarms and better contours on object boundaries. Based on both the data generation and network adaptation, the instance segmentation net improves the performance significantly, compared to both traditional methods and the general knowledge net alone.

Referring to FIG. 1, an image processing system 100 may include an object recognition system 102 to perform the object recognition methods described herein. The image processing system 100 also may have an image and annotation input unit 104 that may or may not be considered a part of the object recognition system 102. The object recognition system 102 optionally may have an initial instance detection unit 106 as described below, but otherwise has a data generation unit 108, an instance segmentation unit 110, and a neural network training database 112. In a customization or fine-tuning mode, the object recognition system 102 performs an iterative looped or circular training process to train an instance segmentation neural network on objects added to the system by a user during this mode. To perform this process, the data generation unit 108 receives the images with the desired objects and provides candidate masks for the objects. A quality assessment is performed to determine which candidate mask is the most accurate mask and then adds the selected mask to the training database 112 thereby making the added masks or data reliable. The instance segmentation unit 110 obtains the added objects and performs adaption processes to train the instance segmentation neural network 120 with those new objects and outputs segmentation masks for those new objects. The segmentation masks are then used to perform the quality assessment by comparing the segmentation masks to the candidate masks of the same instance.

Now in more detail, and first regarding a pre-training mode of the system 100, the data generation unit 108 has a generic neural network (or just net) unit 114 that operates a generic neural network (Gen. Net) 116, and the instance segmentation unit 110 has an instance segmentation neural network (net) unit 118 that runs an instance segmentation neural network (Ins. Seg. Net) 120. Both of these units may include pre-training modules to generate initial or default neural networks, or may communicate with remote pre-training modules to generate the initial neural networks 116 and 120 that are subsequently uploaded to the general knowledge net unit 114, and which may be fine-tuned remotely or on the device, and instance segmentation net unit 118 respectively on a computing device with the logic and software of the object recognition system. The pre-training may include initially training on public (or general knowledge or generic) datasets and then fine tuning the networks on augmented data of each instance. The details of the pre-training are provided below with process 300.

In the customization setup mode, a user (or automatic program initiated by the user) video records one or more target objects to be recognized in the future during a run-time or inference mode. The image and annotation input unit 104 receives the images from the user in the form of a video sequence and then enters annotations from the user for the first frame of the video sequence, but could be a different frame or a different number of frames substantially less than all of the frames of the video sequence. By one form, the uploaded first image is shown to the user on an interface, and the user draws a border around the instances (or objects) to be recognized, with a different color for each object for example, and then enters the annotation for each identified instance. This automatically generates a count of the number of instances to be trained on during the customization setup mode. If there are other instances that appear in the uploaded video sequence, these instances are ignored. Also, if one or more of the instances disappear from the recorded field of view during the video sequence, it will not affect the object recognition either. For example, suppose there are two instances in the input video sequence. After the first frame of the video sequence, no matter how many instances there really are, the customization setup mode will segment the two target instances. Thus, if one of the two instances disappear form the images, the customization setup mode object segmentation is still performed twice, once for each object. For the missing instance, the output of the instance segmentation neural network provides a null result. By one form, the user may be instructed to video the object or objects preferably from varying perspectives. The image data may be pre-processed by this unit or other units sufficient for object recognition operations as described below.

By another option, after the user uploads the video sequence, an initial instance detection unit 106 then analyzes the frames of the video sequence, and particularly the first frame of the video sequence, and may provide at least a coarse object segmentation for each frame where the location of each object or instance on a single first frame is identified and counted.

Thereafter, the object recognition system 102 then performs the object recognition (including instance segmentation) one instance at a time by analyzing the entire video sequence to adapt the instance segmentation of one of the instances as described in detail below. Then, analysis of the video sequence may be repeated for each instance, or the video sequence is analyzed separately for each instance in parallel.

Particularly, for a single instance, each of the frames of the video sequence is analyzed, and this is repeated for a number of iterations for each instance, such as three. The general knowledge net unit 114 inputs the images from the video sequence one frame at a time to the general knowledge neural network 116 and provides a set of candidate masks j for the current frame t, and for a single instance, where each candidate mask is designated $C_{tj}$.

The instance segmentation net unit 118 also receives the frames of the video sequence and analyzes the image data of the frame, one frame at a time as well, and for the same instance being analyzed by the general knowledge net unit 114. The output of the instance segmentation neural network 120 is a segmentation mask $M_t$, and in one form, a binary segmentation mask. Both the candidate masks and segmentation mask are provided to a quality assessment unit 122 that may be part of the data generation unit 108. The quality assessment unit 122 compares the masks and determines which candidate mask is most similar to the segmentation mask. This may be determined by comparing the differences between the segmentation mask and each candidate mask to a threshold. By one form, this includes comparing a quality score to a threshold and that is formed by color histograms and computing a weighted Jaccard similarity coefficient or index (or simply referred to herein as the Jaccard for short) between the candidates and segmentation mask as described below. The score is then compared to the threshold or other criteria to select one of the candidates as the best candidate for addition to the training database 112, also referred to herein as the added mask which may become a sample to be used to adapt the instance segmentation neural network (or ISNN) 120. By one example, the training database 112 only holds the added masks, and the pre-training initial datasets for the general knowledge neural network and the instance segmentation mask are kept separate from the training database 112. Those initial datasets may be fixed and/or updated over time separately from the customization setup mode described herein.

Turning to adaption of the instance segmentation neural network 120, two adaption techniques are used: a local adaption and a global adaption. The local adaption adapts the instance segmentation neural network to output fine segmentation masks on a target frame based on training database samples from other frames depending on how temporally close the sample frame is to the current target frame being analyzed and along the video sequence. The closer the frame is temporally, the more likely the instance segmentation neural network (or ISNN) 120 sample will be adapted with the sample of that frame. The local adaption unit 124 will determine which training database samples to be chosen to adapt the instance segmentation neural network as described below.

A global adaption unit 126 adapts all samples from all frames of the video sequence (for the current instance) to the ISNN 120. The global adaption unit 126 performs this adaption after the whole video sequence, or designated multiple-frame part of the video sequence, is analyzed for a single iteration as tracked by an iteration counter 128. Again, this is performed for a single instance for a set number of iterations. The process is then repeated for each instance.

In the online run-time (inference) mode, run-time (inference) input 130 is provided to the instance segmentation net unit 118 for running the ISNN 120. A conditional random field (CRF) classifier 132 collects the binary masks for each instance and combines them into a single frame to output instance masks for a frame that can be used by other applications, whether computer vision applications, and so forth.

Referring to FIG. 2, a process 200 is provided for a method of object recognition for imaging processing. In the illustrated implementation, process 200 may include one or more operations, functions or actions 202 to 212 numbered evenly. By way of non-limiting example, process 200 may be described herein with reference to example image processing system 100 of FIG. 1 or example image processing system 900 of FIG. 9, and where relevant.

Process 200 may include "obtain image data of frames of a captured video sequence and including content of at least one object to be recognized and added to a neural network training database of objects in order to customize the neural network training database by including at least one desired object of a specific user" 202. This operation may include a user activating the customization setup mode by either uploading a video sequence to a certain application or program or by indicating by signal, electronic switch, or so forth on such application or program to begin the mode. This may involve a user taking a video of one or more objects the user would like his/her device, such as a smartphone, to be able to recognize. The user may capture the images manually with the smartphone camera or other device, or a computer vision system may automatically capture the images such as on a system where a camera is setup for such an arrangement. An interface may be provided to instruct the user on how to capture the images and enter a label or annotation for the objects in the images. By one form, the annotations only label the objects on the first image of a video sequence. The result is a video sequence of the image data to be used for customized training neural networks of an object recognition or segmentation system. This operation also may include obtaining the video sequence in the form of pre-processed raw image data with RGB, YUV, or other color space values in addition to luminance values for a number of frames of a video sequence. This operation also may include obtaining depth data when the depth data is used for segmentation analysis.

Alternatively, although the examples discussed herein will receive the video sequence from the user, it will be understood that a decision to capture video for the object recognition training purposes in the first place could be completely automatic where a computer vision device or application may not recognize an object in images and decides to prompt a user or other application for the recognition annotation or label, and then provides the images and annotation to the object recognition system provided herein. For instance, first, class-insensitive object detection and/or segmentation methods may be performed (see for example, Uijlings. J. R. R. et al., "Selective Search for Object Recognition",", International Journal of Computer Vision, technical report (2012); and Van de Sande, Koen E. A., et al., "Segmentation as Selective Search for Object Recognition", International Journal of Computer Vision, Volume 104 (2). pp. 154-171 (2013). Then, for each detected and segmented object, conventional object recognition, detection and/or segmentation algorithms can be run for instance count for the customization setup training (see for example, Redmon, Joseph et al., "Yolov3: An incremental Improvement", arXiv (2018)). This algorithm may be used for the automatic segmentation mentioned above with the initial instance detection unit 106 as well. If the automatic recognition and instance counting fails, then a user may be prompted on an interface to manually identify and annotate the desired objects of captured video.

Process 200 may optionally include "input the frames into a general knowledge neural network associated with a generic database to output a plurality of candidate masks associated with an instance of an object" 204. This may include generating a generic neural network based on known generic databases for example. The database, and in turn, the neural network, may be fine-tuned during a pre-processing mode to increase the accuracy of the neural network to recognize more variations of the objects already in the database and improve accuracy to recognize objects not yet in the database. Thereafter, the image data from the user may be received during a customization or fine-tuning mode. By one form, the image data is already run through an initial segmentation algorithm to provide a count of the objects or instances in the images. Then, the general knowledge neural network may analyze the images instance by instance, and outputs a set of candidate masks for each single instance.

Then, process 200 may include "customizing the training database by adding an added mask to the training database and that is a selected one of the plurality of candidate masks" 206, and therefore, the method then will select one of the candidate masks to be added to a training database. Each mask may be in binary, gray scale, or other scale that reveals which pixels are part of an object and which are not to indicate the boundary of the object.

This operation also may include performing a quality assessment to provide a quality score for each of the candidate masks. By one approach, the score includes a comparison of one of the candidate masks to a segmentation mask from an instance segmentation neural network. By one form, there is a score for each candidate mask. The score may include a comparison of color histograms and computation of a weighted Jaccard by one example, but other algorithms could be used. The scores may be compared to a threshold or other criteria to determine which candidate mask to add to the training database.

Once the candidate mask is selected, the candidate mask, the corresponding image or frame forming the object (or instance) in the mask, and the annotation for the object or instance are stored in the training database as part of a custom dataset.

Meanwhile, process 200 also may include "input the frames into an instance segmentation neural network to output a segmentation mask" 208, and this may include providing the same user video sequence to the ISNN, which also operates epochs one instance at a time. The ISNN receives a single frame, frame by frame, as input, and outputs a segmentation mask for the instance and for each frame. During a customization setup mode, the ISNN performs spatial recognition and does not perform semantic recognition since the ISNN is operating for a single instance and the annotation or label is already known. Also during this customization setup mode, the segmentation mask is used to compare to the candidate masks for the quality assessment as mentioned above. The details of the structure of the ISNN are provided below.

In order to train the ISNN for the customized objects added to the training database, process 200 also may include "modify the instance segmentation neural network to form a modified instance segmentation neural network wherein the modifying is based at least partially on at least one added mask in the training database" 210. By one example, this may include a local adaption operation or a global adaption operation. By one form, both operations are used. This involves running the ISNN on samples (or added masks) added to the training database but that are provided over a number of frames. For local adaption, the local adaption is run every frame and the closer the frame is to a current frame being analyzed and along the video sequence, the more likely the ISNN will be adapted by using the sample or added mask of that frame. For example, each sample of the same instance and within the closest five frames may have a 70% percent chance of being used, while samples from frames temporally farther from the current target frame may only have a 30% chance of being used. By other alternatives, fixed intervals could be used instead or in addition such that every sample of the closest 10 frames are used, then every other frame for the next 10 frames, and then every 5 frames for the next 100 frames, and so forth.

The global adaption is run once at every iteration on an entire video sequence, and the ISNN is run on a sample of the same instance for every frame in the video sequence. This duplicates samples so that both the global and local adaption may use the same samples from the training database, which results in stronger recognition of those particular samples as mentioned above.

Process 200 may include "perform object recognition during an inference run-time by using the modified instance segmentation neural network" 212. This refers to the online run-time (or inference) mode after the training during the customization setup mode so that now images are being captured for the object recognition itself. During this mode, the ISNN output segmentation mask is used as the final object recognition mask. It may be provided to a classifier that collects all instances of the same frame and forms a single mask for an entire frame, as described below, his frame-based mask then can be provided for further fine-tuning or could be provided to other applications that use the object recognition such as automated vehicle systems, different reality systems (virtual, augmented, and so forth), or other applications that identify objects in an image such as a medication recognition program mentioned herein.

Thus, this semi-supervised video object segmentation method disclosed herein provides a user-accessible customization setup mode that performs data generation and neural network adaptation. The present system does not require domain-related (annotated) large datasets for training. Instead, given only one annotation, the system generates reliable training data from unlabeled videos. Also, the instance segmentation neural network here increases its capability to recognize objects as more data is accumulated during the customization setup mode. The instance segmentation neural network gradually adapts to data variations in both foreground and background as frames of the video sequence are being analyzed in this mode. Based on these two advantages, the proposed method is able to be applied with small datasets and user-defined object understanding of scenes.

Referring to FIGS. 3A-3C, a process 300 is provided for a method of object recognition for imaging processing. In the illustrated implementation, process 30 may include one or more operations, functions or actions 302 to 366 numbered evenly. By way of non-limiting example, process 300 may be described herein with reference to example image processing system 100 of FIG. 1 or system 900 of FIG. 9, and where relevant.

During the pre-training mode, process 300 preliminarily may include "preform pre-training of general knowledge object recognition neural network" 302. The general knowledge (or generic) neural network is used to generate candidates of instance masks. The input to this neural network is an image of a video sequence where only the first image (or other small number of frames such as at intervals, etc.) is annotated, and the output is a set of candidate masks. In order to learn the general knowledge of the appearance, shape, and other variations of an object in a class-insensitive way to adapt the general neural network database to any object type, the neural network may be first trained on large generic datasets such as in ImageNet (see Russakovsky, O., et al., "Large Scale Visual Recognition Challenge", airXiv: 1409.0575v3 (2015); Fei, L., et al., "Analysis of Large-Scale Visual Recognition", Bay Area Vision Meeting (2013)), and COCO (Lin. T. Y., et al., "Microsoft COCO: Common Objects in Context, ECCV (2017). In the present implementation, the general knowledge neural network has the architecture in the form of a Mask R-CNN.

Since one (or some other selected low number) of annotated frames are used on the input pre-training video sequence, and therefore to avoid overfitting, the target objects on the input annotated frame are augmented (or varied) to form thousands of training frames for each object. Also, by one example, the augmented data only may be used on the last two layers of the general knowledge neural network for fine tuning and for a few epochs. As a result, the general knowledge neural network is able to handle many more variations of the objects it has trained on, due to the training on the augmented data, but it also is able to detect and segment other new objects not already experienced. Lucid data dreaming methodology (cited above) then is used to synthesize new data into the general knowledge neural network by simulating foreground change in illumination, deform, etc. The pre-training dataset of the general knowledge neural network is kept separate from the training database 112 used for instance segmentation training during the customization setup mode as mentioned above.

Similarly, process 300 preliminarily may include "pre-form pre-training of instance segmentation neural network" 304. Here, the instance segmentation neural network (ISNN) uses the parent-net in OSVOS as the instance segmentation neural network. The pre-trained weights on the ImageNet (cited above) are used as the base instance segmentation neural network, and this network is fine-tuned on a binary segmentation dataset of DAVIS (see Caelles. S., et al., "The 2018 DAVIS Challenge on Video Object Segmentation" arXiv preprint arXiv:1803.00557 (2018)). As with the general knowledge neural network, the training instances of the one annotation image is augmented into hundreds of additional training images. The instance segmentation neural network is then fine-tuned to fit each instance based on its pre-training augmented dataset. Also, Lucid data dreaming method (cited above) is used here as well to synthesize new data by simulating foreground change in illumination, deform, etc. The instance segmentation net is denoted as N herein for process 300 and on Algorithm 1 in the summary described below.

The pre-training mode for both neural networks may occur at least partly offline and remote from the camera providing the video sequence during a customization setup mode, and remote from the mobile device or other computing device or server that will perform the object recognition analysis described herein. By one form, the initial training of the neural networks by the public or generic datasets are performed offline, but the augmentation of the images and fine tuning during pre-training may be performed on the mobile device. By another form, while all or part of the pre-processing is remote, both the customization setup and run-time (inference) modes are performed on the same device, and by one form, the same device as the camera capturing the video sequence for the customization setup mode. By yet another form, all three modes are performed on the same device, which may or may not be the same device capturing the images for the video sequence.

During the customization (or fine-tuning) mode, the process 300 may include "obtain image data of video sequence" 306. This may include "obtain image" 308. This involves a user determining that he/she would like one or more objects recognized by his/her device, whether a smartphone, tablet, computer, or web cam, or could be any other camera of a particular object recognition system such as on a vehicle or VR goggles, and so forth. The user then may manually position the camera to video record the object, and by one form, from different angles to obtain different views of the object. More than one object may be captured in the field of view of the camera. The video sequence should capture as many different perspectives of an object as possible, and the video should have about at least 300-500 frames (10 to 20 seconds of video with a fps rate of 25). By other forms, the objects are placed in front of a pre-set arrangement of one or more computer controlled cameras, or the camera arrangement is placed next to the object or objects, and the user activates the one or more cameras to automatically capture images of the objects including multiple cameras or single cameras that move automatically to capture different views of the objects, or objects that are on a rotating table for example. A website, mobile app, or other screen interface may be used for the user to activate the customization setup mode and may confirm entry and analysis of the video sequence from the user as well as identification of the desired objects. By an alternative form, the activation of such a camera arrangement could be automatic as well as mentioned above.

Process 300 may include "perform pre-processing" 310. Whether the uploaded images are to be displayed to a user so the user can select and identify objects to be recognized, or an initial object recognition is to be automatic, the images may be pre-processed sufficiently for object recognition operations. The pre-processing could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth when desired. Also, the color and luminance pixel values of the images may be provided in many different additional forms such as gradients, histograms, and so forth. In addition, depth image data, when used, may be determined by a stereo camera system, such as with RGBD cameras, that captures images of the same or moving scene from multiple angles. The system may perform a number of computations to determine a 3D space for the scene in the image and the depth dimension for each point, pixel, feature, or object in the image. Otherwise, other ways to determine three dimensions from a single camera are possible such as time-of-flight, and structural or coded light technologies.

Then operation 306 also may include "obtain annotation" 312. The video sequence should have one frame of annotation, and by one form, only the first frame has the annotations. Alternatively, this could be more frames could have the annotations but that may be less efficient and require more unnecessary semantic computations. By one form, a user provides each object or instance on the annotation frame that is to be recognized a single label as the annotation by drawing a border or edge around each object to be recognized, and a field for entry of the label may appear for each such object. Each border for a different object, the interface may have a different border type prompt for the user and by color or line type, like dashes, to differentiate the objects among each other by one example. The annotation can be a single word or multiple words. The website, app, or interface for entry of the images also may provide a screen for entering the annotation for each object on the first image of the video sequence.

Process 300 then may include obtain instance count" 314. When the user is identifying the objects and entering the annotations, the count of the instances may be automatic and instantaneous upon the user's entries. By an alternative option mentioned above, the instance count may be automated once the user uploads the video or the selection of the objects may be automated as well. In this case, once the images are received and pre-processed sufficient for object detection, an initial object segmentation may be applied to determine how many objects are on a single image in the video sequence and to provide a coarse object location for each object. This may be performed by known algorithms as mentioned herein.

No matter how the instance count is obtained, the total number of instances on a single image may establish a maximum number of instances I=i to max. The system may be described as generating a separate instance segmentation neural network for each instance I. Thus, assuming the video contains I target instances, the instance segmentation unit contains I segmentation nets, and the customization object recognition will be run separately I times. By another alternative, the user may define the areas of an image on the interface mentioned above and with each object, such as by placing a bounding box around each object in the image, and then indicating, on the interface, the total number of objects to be recognized and trained on.

Process 300 then may include "set instance I=1" 316 to set the instance count and start with the first instance on the images. The same video sequence will be analyzed for each instance separately during the customization setup mode (whether in parallel or consecutively).

Process 300 then may include "set iter=1" 318 to set the iteration count. Specifically, the method is iteratively conducted by repeating the analysis of the video sequence for each iteration and for multiple iterations of each instance so that each instance has multiple iterations of analysis. Each iteration should act to further fine tune the instance segmentation neural network. The number of iterations is determined by experimentation, and by approach, three iterations are used. Each iteration includes the operations of both the data generation unit and the instance segmentation unit.

The first operation for the iteration I is "initialize training database D" 320 where the training data set D is initialized by adding the input annotations to the dataset in the database, and this also sets an iteration instance segmentation neural network $N_{iter}$ the same as the instance segmentation neural network N (here where N is in its initial or default form, but subsequently as adapted by local and global adaption as explained below). To start, the default instance segmentation neural network N is that formed by the pre-processing.

Process 300 then may include "set frame t=1" 322 where the frames may be indexed t=1 to T, and to start the analysis with the first frame 1 of the video sequence and for the current iteration iter=1 and instance I=1.

Process 300 next may include "input frame t of video sequence into the general knowledge neural network for instance I" 324. This refers to the operation of the general knowledge net unit that receives the input frame and generates training data, and by one form, at the device of the user during the customization setup mode, and for each frame. By alternative forms, the neural network processing during the customization setup mode may be performed remotely at a server for example, such that the input images are transmitted to the server, and output of the networks is transmitted back to the user's device. The general knowledge neural network, as mentioned above, may be a pre-trained Mask R-CNN network, but many other network structures could work. The output of the general knowledge neural network is a set of candidate masks $C_{tj}$ with K candidates where j=1 to K. Each mask is either binary, gray scale, or other scale to indicate the pixel level location of the object boundaries. Thereafter, process 300 may include "obtain candidate masks from general knowledge neural network for frame t" 326.

Turning to the instance segmentation unit for a few operations, process 300 may include "input same frame of video sequence into instance segmentation neural network" 328, and thus to begin, frame 1 is input to the instance segmentation neural network as well. The structure of the instance segmentation neural network is as mentioned above for the pre-processing, but otherwise will be modified as it adapts new data from the data generation unit as described herein. Due to the instance-based operations, the instance segmentation neural network is adapted separately for each instance, and evolves frame by frame, and iteration by iteration for each instance as described below. The instance segmentation neural network may provide masks in binary or other gray or color scales, and when binary, may be referred to herein as a binary segmentation net or just the segmentation net. Thus, each instance may have a different segmentation net (or instance segmentation neural network (ISNN)).

The output of the instance segmentation neural network is a segmentation mask $M_t$ that shows the boundaries of the instance or object and is associated with the annotation of the corresponding object. By one form, the mask $M_t$ may be a binary mask. This mask is used for the quality assessment. Thus, process 300 may include "obtain single mask $M_t$" 330.

Process 300 may include "determine best quality candidate mask" 332, which refers to a quality measurement or assessment to measure how likely the annotation, shape, and appearance of the candidate mask is correct. For this purpose, process 300 may include "determine comparison scores between mask $M_t$ and individual candidate masks $C_{tj}$" 334. The quality score represents the similarity between each candidate and the mask $M_t$. BY one example herein, two features may be used for the measurement: the color histogram similarity, and the Jaccard $\mathcal{J}$ (intersection over union) between the candidate and the mask $M_t$. The quality score is represented by a weighted sum of these two similarities.

$$\text{score}_{tj} = \cos(f_{C_{tj}}, f_{M_t}) + \beta + \mathcal{J}(C, M_t) \quad (1)$$

where $\text{score}_{tj}$ is the quality score for the j-th candidate in the t-th frame, the f is the color histogram, $C_{tj}$ is the candidate at the t-th frame, $M_t$ is the mask of the instance segmentation neural network, $\mathcal{J}$ is the Jaccard, and β is a weighted here set at β=1.5 in the present implementation and that is determined by experimentation.

Process 300 may include "compare scores to a criteria" 336. By one example, the scores are compared to a threshold $\text{th}_{quality}$, and the threshold is determined by heuristics. The threshold may be fixed throughout the analysis for all instances and iterations, or may be varied depending on the instance or iteration in order to add more samples to the training dataset. In other words, the reason to modify the threshold is to attempt to select only reliable samples at each iteration for addition to the training database. For example, at early stages, the output of the instance segmentation neural network may not be very accurate. In this case, high threshold values are used to limit the selections for training data to only those samples with very high confidence values. At later stages, the instance segmentation neural network becomes more and more accurate so that the threshold values can be reduced to add more samples to the training dataset since more samples will be accurate. The selected top candidate mask $d_t$ is the one with the highest quality score, and this score is compared to the threshold. If the quality score is higher than the threshold $\text{th}_{quality}$, then the process 300 may include "add best candidate mask to training database" 338, where the best candidate mask $d_t$ is appended to the training database (or training data set D=D U $d_t$) also referred to as an added mask. The best candidate masks are accumulated in the training data set from the first frame to the last frame and as the video evolves, and to form a dataset of customized added masks thereby customizing the training database.

Turning now to the instance segmentation neural network fine tuning and adaption, the accumulated training data at the training database are used to update the instance segmentation neural network in two levels, the local adaptation to adopt good segmentation on single frames, and the global adaptation to learn and adapt dynamic changes from frame to frame in the video.

Thus, process 300 may include "perform local adaption" 340, and particularly to adapt the instance segmentation neural network (ISNN) to the added masks in the training database. The local adaption is conducted in every frame as the video evolves, and at each iteration so that the local adaption fine-tunes the net $N_{iter}$ (the instance segmentation neural network at the i-th iteration).

To perform the local adaption, process 300 may include "use a greater number of samples as frames are closer to the target frame being analyzed" 342, so that the local adaption uses high sample rates on data from nearby frames and low rates on those from distant frames. Particularly, for each iteration of a single instance, there is one instance (or object or associated added mask) on one frame. The added mask (or instance or object) in the frame closer to the current target frame being analyzed and along the video sequence has a higher probability to be chosen as the training data for fine tuning (or adapting) the instance segmentation neural network. Thus, an instance from a closer frame is more likely to be chosen as the training data. In other words, for a single instance, the fine tuning may include hundreds to thousands of frames of the video sequence that are analyzed for multiple iterations. At each frame, one instance sample may be selected from the training database (or dataset) to fine tune the instance segmentation neural network. Each instance in the dataset is chosen with a different likelihood. By one example used here, the probability of 0.7 is assigned to the closet 5 frames along the video sequence, and 0.3 to other frames farther away. Thus, if the fine tuning requires 100 frames, the system chooses instance sample in the training database 70 times from the closet 5 frames, and 30 times of instance samples from other frames. The likelihood value (0.7 and 0.3 in the current example) is decided by experimentation.

Process 300 may include "perform adaption by inputting image corresponding to the added mask while using the added mask as supervised output" 344. When the top candidate mask (or added mask) is saved to the training database, the corresponding color image also is saved. These images are the input training data for fine tuning or adapting the instance segmentation neural network, while the saved added mask is the supervised spatial mask output with a known annotation, since the instance is known.

Process 300 may include the inquiry "last frame t?" 346, that determines whether the last frame of the video sequence has been reached. If the last frame is not reached, the process 300 sets 348 the frame t to the next frame in the video sequence, and loops back to operation 324 to repeat the semantic net adaption for the next frame, still with the same instance I, and still within the same iteration iter.

If the last frame in the video sequence has been reached, process 300 then may include "perform global adaption" 350, and particularly to "obtain added mask data from training database of all frames of the video sequence" 352, and specifically for the current instance being analyzed. The global neural network adaptation learns the dynamic variations of each instance through the whole or substantially whole video. Thus, at each iteration iter, after all frames are analyzed, each instance segmentation neural network N is fine-tuned on all (or substantially all) of the added masks of each frame in the video sequence (or in other words, the entire training dataset of added masks of the video sequence for the current instance).

Then the adapted instance segmentation neural network N is used as the initial segmentation net in the next iteration. For this, process 300 may include "run global-modified instance segmentation neural network as initial instance segmentation neural network of next iteration" 356.

Referring to FIG. 4 as a summary diagram 400 of the adaption operations, the segmentation net may be updated at two levels: local adaptation and global adaptation. As the video evolves, the local adaptation is performed in every frame t=1 to T as shown on video sequence 402. Local adaption fine-tunes the segmentation net on training data (which is stored in database 404) from nearby frames to gain good segmentation results. After all frames are processed, the global adaptation is conducted by fine-tuning the segmentation net on all training data 404 from the video sequence and for the current instance, in order to learn the dynamic variances of the video. The global adaptation and the local adaptation is iteratively conducted, as summarized in the Algorithm 1 shown below as well, and as described above where N is the segmentation net initially trained offline and/or during pre-processing, but will be updated at the end of each iteration, and $N_{iter}$ is the segmentation neural network which will be updated every frame. The pyramid 406 represents the adapted instance segmentation neural network and providing the latest segmentation neural network N for the next iteration of frame analysis as per operation 356 above.

Process 300 may include "update quality measure threshold" 358, and this is performed by reducing the threshold values, which is determined by experimentation, and for the reasons mentioned above. By one example, the threshold values may be reduced by 10%. As more global adaptation are performed over more iterations, the instance segmentation neural network output has increasingly better contours so that the threshold values can be reduced to add more samples to the training dataset as mentioned above.

Process 300 then may include the inquiry "max iteration iter?" 360, to determine whether the last iteration has been reached. If not, the iteration counter is raised by one at counter operation 362, and the process loops back to operation 320 to initialize the training database and begin analysis with the first frame of the video sequence again. The initializing of the training database includes tasks mentioned above for operation 320. If the last iteration has been reached, process 300 may include the inquiry "last instance I?" 364, to determine whether the last instance has been analyzed. If so the process is ended, the instance segmentation neural network has been adapted or modified, and is now ready for a run-time inference mode.

If the last instance has not been analyzed yet, process 300 then may include "obtain first frame to train next instance" 366, and the process loops back to operation 318 to set the iteration count back to one and begin customized neural network training for the next instance in the video sequence.

An algorithm 1 that is a summary of the customization or fine tuning setup mode process may be stated as follows:

Algorithm 1. Instance Segmentation and Two Level Adaptation

```
Input: Pre-trained segmentation net N = N_pretrain
Output: Binary mask set {M_t, t = 1, ..... T} N_0 = N_pretrain
  1:   for iter = 1....maximum_iter do
  2:         Initialization: training set D = [ ], N_iter = N_iter-1
  3:         for t=1...T do
  4:               General knowledge net: generate candidates C_tj(j = 1, ...K)
  5:               Instance segmentation net: Obtain binary mask M_t
  6:               Quality measurement unit: generate training data d_t with th_quality.
  7:               Accumulate training set: D = D ∪ d_t
  8:               Local adaptation unit: fine-tune (or update) N_iter on D
  9:         End for
 10:         N_iter = N_pretrain (referred to as initializing the net parameter)
 11:         Global adaptation unit: fine-tune N_iter on D
 12:         Update quality measurement threshold th_quality.
 13 :   End for
```

Figure 5:
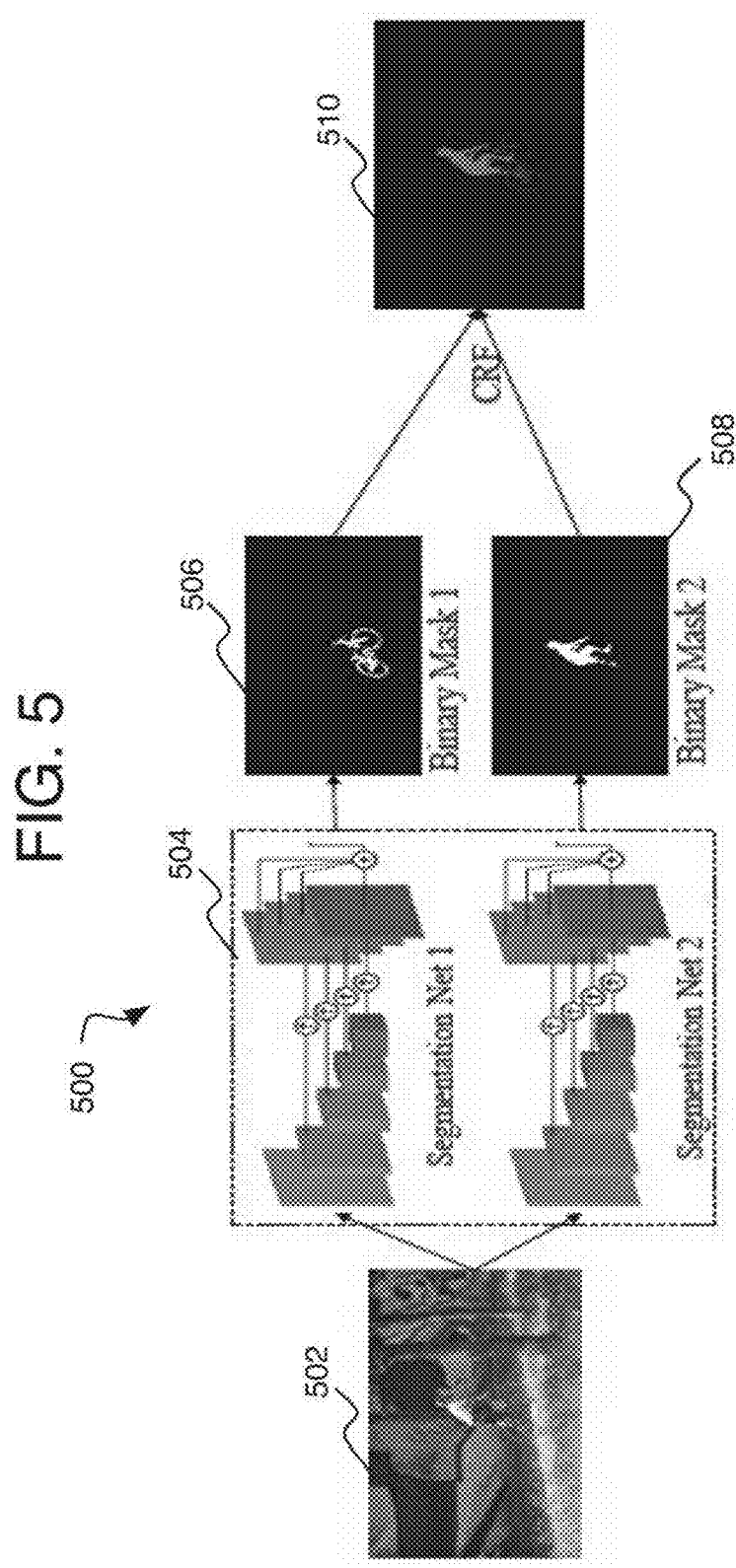
FIG. 5 is a schematic flow diagram of a method of merging object segmentation masks according to at least one of the implementations herein.

Referring to FIG. 5, in the subsequent run-time or inference mode, a technique may be used to combine the instance segmentation masks into a single frame-based mask for use by other applications. One example of such a technique is a fully-connected Conditional Random Field (CRF) classifier (see Krähenbühl. P. et al., "Efficient inference in fully connected CRFs with gaussian edge potentials", Advances in neural information processing systems, pp. 109-117 (2011)). While the segmentation net computes a binary mask for each instance, the CRF merges all binary masks into one mask as the final object recognition output for a frame. The merged single frame-based mask will have the labels 1 to L for example, of all instances on the frame. This is demonstrated on mask merge flow diagram 500 that shows an input frame or image 502 input to instance segmentation neural network 504 where each instance on the frame, here a person and a bicycle, generates a separate segmentation mask 506 and 508 respectively, which are then merged into a single mask 510 by CFR.

Thereafter, applications may use the mask for a number of reasons mentioned herein. Since video object segmentation is a fundamental computer vision task, it has important applications in video editing, smart home, robotics, and autonomous driving to name a few examples. The proposed method also can be embedded in a tablet, laptop, chromebook, smartphone, PC, smart-TV, etc. With this technology, these devices can provide many value-added services on segmentation related applications.

Figure 6:
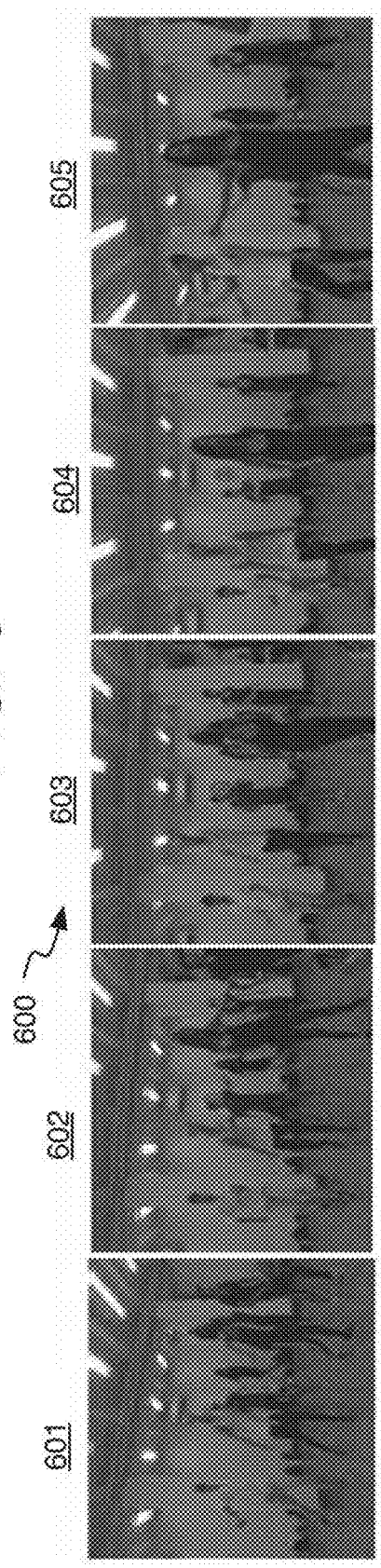
FIG. 6 is a sequence of example video images with objects to segment.
Figure 7:
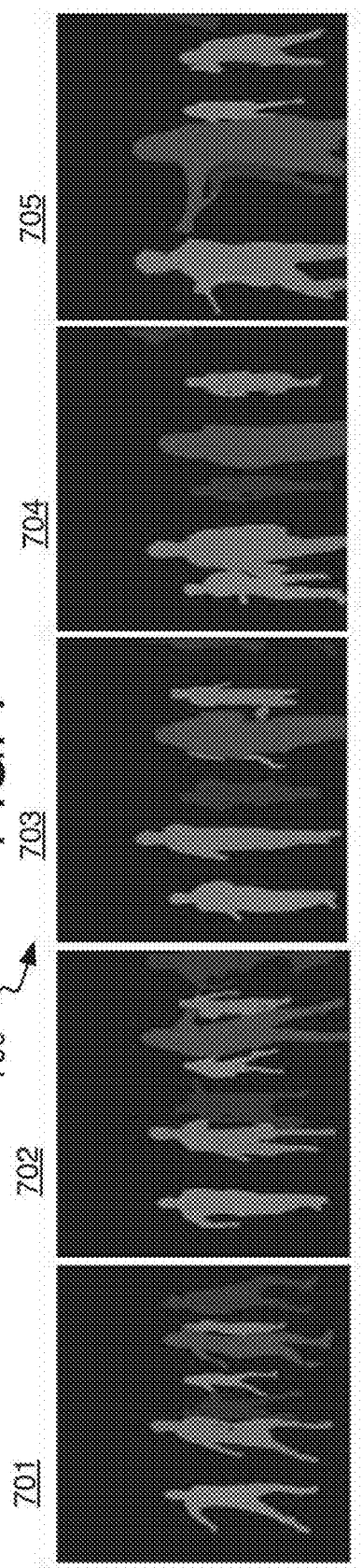
FIG. 7 is a sequence of example resulting object segmentation masks for the video image sequence of FIG. 6.

Referring to FIGS. 6-7, video sequence 600 and example results 700 of object recognition were performed by using the customization mode presented herein. The evaluation here was performed by using the DAVIS 2018 challenge dataset. It had 150 video sequences, with 90 video sequences for training, 30 for evaluation, and 30 for testing. There were 10,459 annotated frames and 376 objects. For the testing dataset, each video only had the first frame annotated. A sequence 700 of resulting segmentation masks 702 to 705 shows good segmentation results based on each corresponding frame 602 to 605.

Figure 8A:
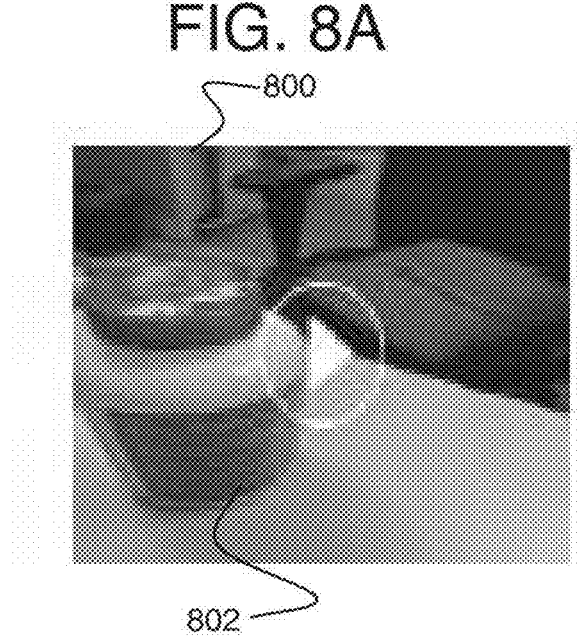
FIGS. 8A-8D are example images used to demonstrate a user-defined dataset entry for the method of object recognition for image processing in accordance with at least one of the implementations herein.
Figure 8B:
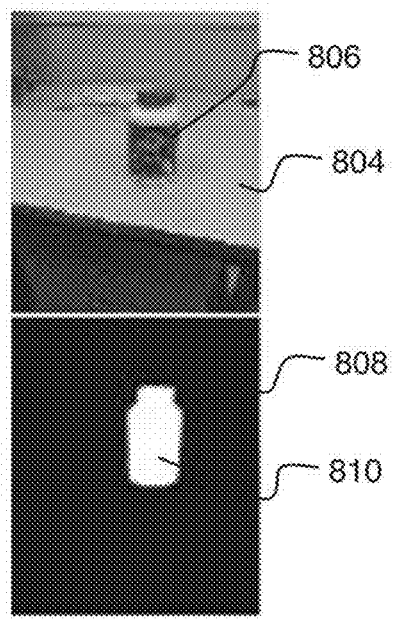

Referring to FIGS. 8A-8D, an example of applying the disclosed method with a small dataset, and a user defined object for scene understanding is presented in images. Here for example, an elderly person may want to identify medication bottles for a robot that daily dispenses certain medications since the person may have difficulty with his/her hands to handle the medications for example. Thus, the robot must understand the identification of each medication. So first the user captures the object 802, here a medicine bottle, in a video sequence 800 (FIG. 8A). The first frame of the video sequence may be labeled manually, interactively or automatically as discussed above. Based on the one shot annotation, the disclosed method or robot automatically generates training data in the form of a color image 804 showing the object 806 and a corresponding added candidate mask 808 with the object 810. Then, the robot or method automatically generates training data from the unlabeled video, and updates the instance segmentation neural network based on the generated data. During a test stage, data of the same object is generated by the device of the user rather than during offline pre-processing for example, and the instance segmentation neural network is continuously adapted along with the data accumulation.

Figure 8C:
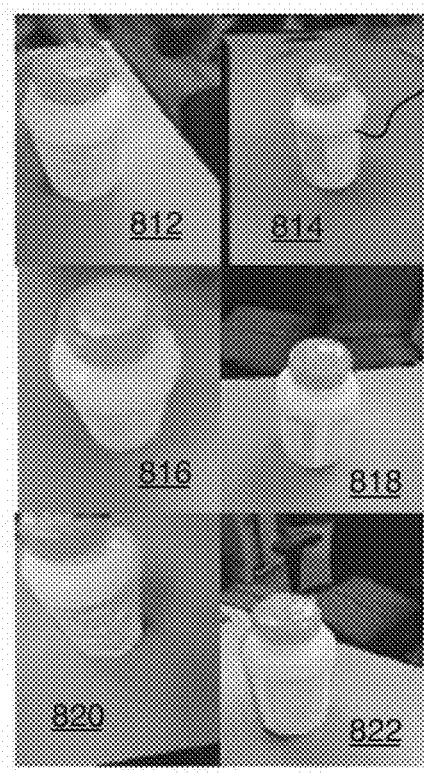
Figure 8D:
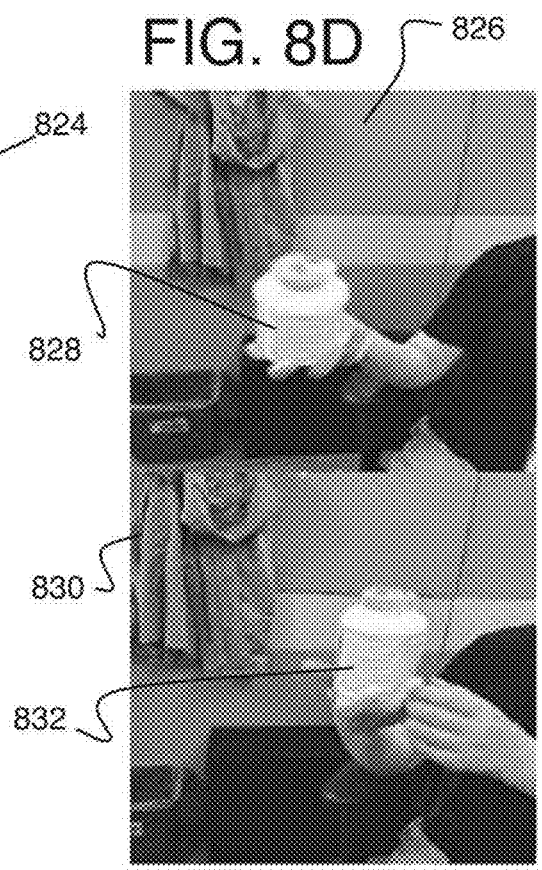

The testing results from another scene (not the user provided video) are shown in FIG. 8C on images 812 to 822 of different perspectives of a bottle 824, where the results are shown in a shaded mask. In the test results, images 826 and 830 (FIG. 8D) show that although only the label on the front side of the bottle 828 was captured, the robot can still recognize and segment the back side 832 of the bottle, which is significantly different than the front side of the bottle. In addition, the method still works when the scene changes.

In addition, any one or more of the operations of FIGS. 4, and 5A-5B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or fixed function firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or fixed function firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
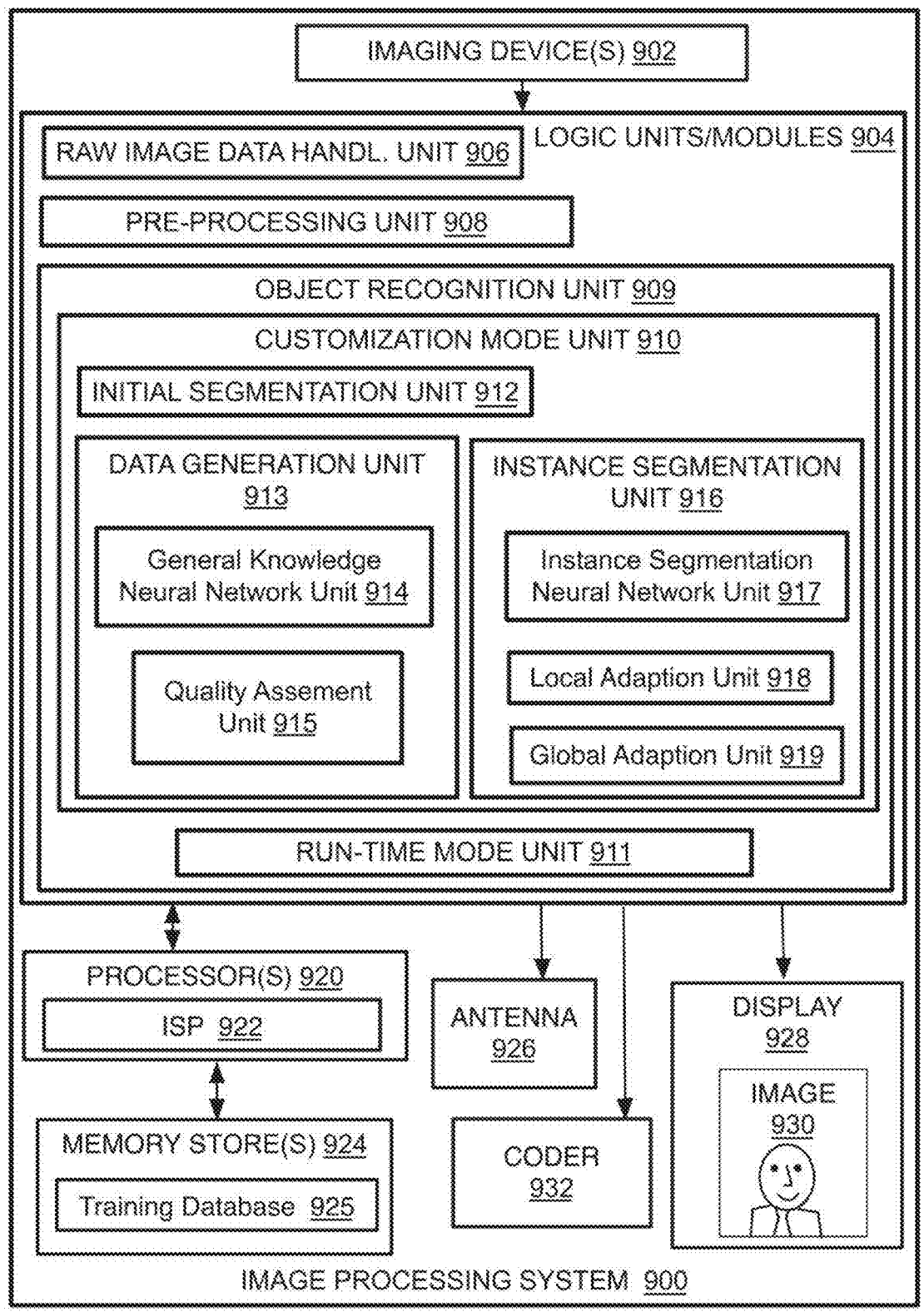
FIG. 9 is an illustrative diagram of an example system.

Referring to FIG. 9, an example image processing system 900 is arranged in accordance with at least some implementations of the present disclosure. In various implementations, the example image processing system 900 may have an imaging device 902 to form or receive captured image data. This can be implemented in various ways. Thus, in one form, the image processing system 900 may be one or more digital cameras or other image capture devices, and imaging device 902, in this case, may be the camera hardware and camera sensor software, module, or component. In other examples, imaging processing system 900 may have an imaging device 902 that includes or may be one or more cameras, and logic modules 904 may communicate remotely with, or otherwise may be communicatively coupled to, the imaging device 902 for further processing of the image data.

Thus, image processing system 900 may be a single camera alone or on a multi-camera device either of which may be a smartphone, tablet, laptop, or other mobile device, and including computer vision cameras and sensors on robots, VR, AR, or MR headsets, and so forth. Otherwise, system 900 may be the device with one or more cameras where the processing occurs at one of the cameras or at a separate processing location communicating with the cameras whether on-board or off of the device, and whether the processing is performed at a mobile device or not.

In any of these cases, such technology may include a camera such as a digital camera system, a dedicated camera device, or an imaging phone or tablet, or other video camera, or some combination of these. Thus, in one form, imaging device 902 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 902 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor also may support other types of electronic shutters, such as global shutter in addition to, or instead of, rolling shutter, and many other shutter types. In other examples, an RGB-Depth camera and/or microphone-array might be used in the alternative to a camera sensor. In these examples, in addition to a camera sensor, the same sensor or a separate sensor may be provided as well as light projector, such as an IR projector to provide a separate depth image that can be used for triangulation with the camera image. Otherwise, the imaging device may have any other known technology for providing depth maps by using multiple camera or imaging devices, or a single imaging device.

In the illustrated example and relevant here, the logic modules 904 may include a raw image handling unit 906 that performs pre-processing such as demosaicing on the image data and then a pre-processing unit 908 that performs further pre-processing tasks as mentioned above for sufficient segmentation which may or may not include generating a depth map or depth image to form a three dimensional space where the pixels or points have three dimensional (x, y, z) coordinates on a resulting depth map or depth image that represents the three dimensional space (or 2D image or set of images of the same scene).

The logic modules also may have an object recognition unit 909 to perform many of the operations already described herein. Thus, for example, the segmentation unit 909 may have a customization mode unit 910 and a run-time mode unit 911. The customization mode unit 910 may have an initial segmentation unit 912, a data generation unit 913, and an instance segmentation unit 916. The data generation unit 913 may have a general knowledge neural network unit 914 and a quality assessment unit 915 as these units are described above. also as described above. The instance segmentation unit 916 has an instance segmentation neural network unit 917, a local adaption unit 918, and a global adaption unit 919 also as described above. A training database 925 may be held in a memory store 924.

The image processing system 90 also may have one or more processors 920 which may include a dedicated image signal processor (ISP) 922 such as the Intel Atom, other GPUs and/or dedicated specific-purpose hardware that run the neural networks for example. The image processing system 900 also may have the memory store(s) 924, one or more displays 928 to provide images 930, a coder 932, and antenna 926. In one example implementation, the image processing system 900 may have the display 928, at least one processor 920 communicatively coupled to the display, and at least one memory 924 communicatively coupled to the processor. The coder 932 may be an encoder, decoder, or both. As an encoder 932, and with antenna 934, the encoder may be provided to compress image data for transmission to other devices that may display or store the image. It will be understood that as a decoder, the coder may receive and decode image data for processing by the system 900 to receive images for object recognition in addition to, or instead of, initially capturing the images with the device 900. Otherwise, the processed image 930 may be displayed on display 928 or stored in memory 924. As illustrated, any of these components may be capable of communication with one another and/or communication with portions of logic modules 904 and/or imaging device 902. Thus, processors 920 may be communicatively coupled to both the image device 902 and the logic modules 904 for operating those components. By one approach, although image processing system 900, as shown in FIG. 9, may include one particular set of blocks or actions associated with particular components or modules, these blocks or actions may be associated with different components or modules than the particular component or module illustrated here.

Figure 10:
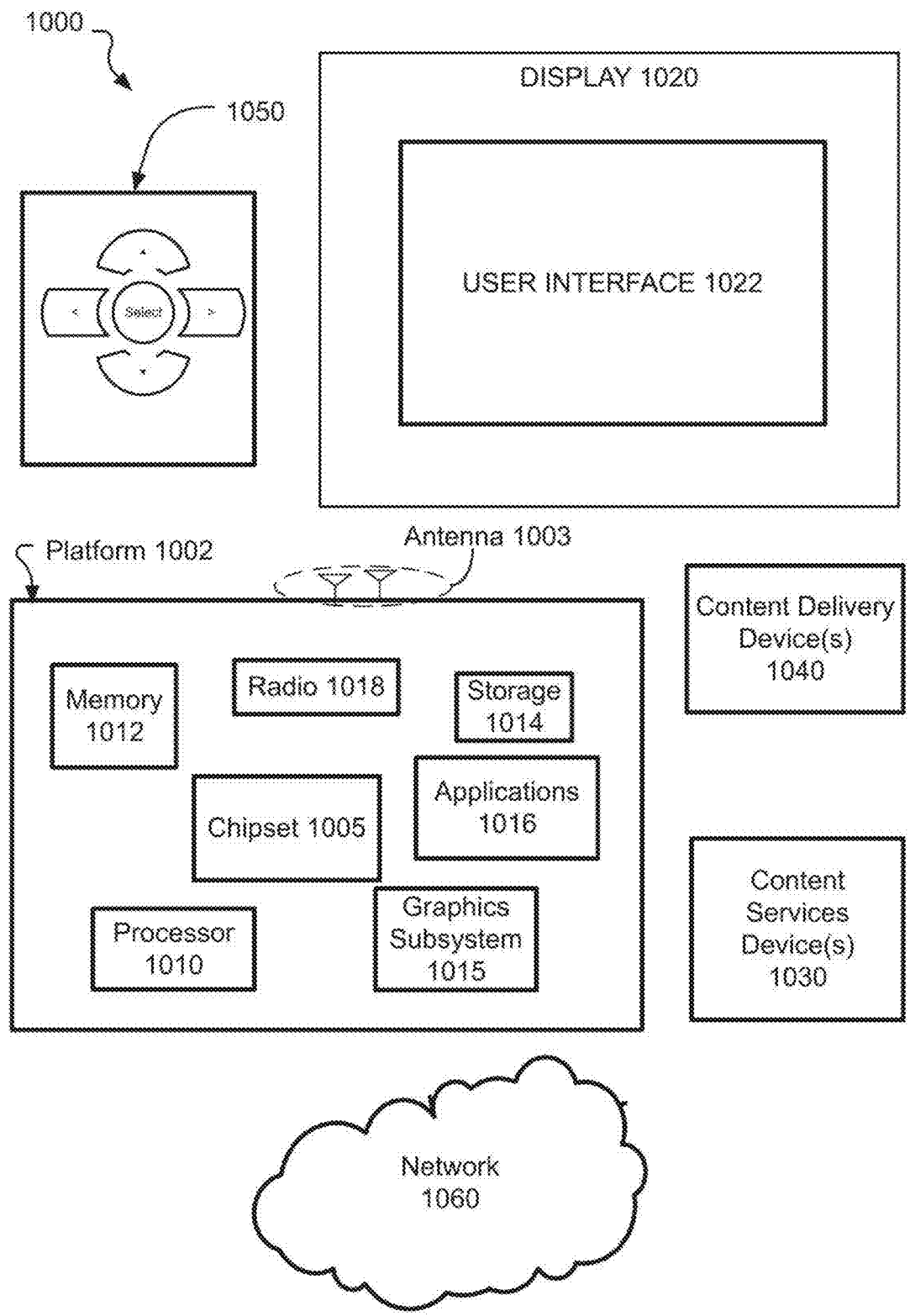
FIG. 10 is an illustrative diagram of another example system.

Referring to FIG. 10, an example system 1000 in accordance with the present disclosure operates one or more aspects of the image processing system described herein. It will be understood from the nature of the system components described below that such components may be associated with, or used to operate, certain part or parts of the image processing system 1000 described above, and therefore, used to operate the methods described herein. In various implementations, system 1000 may be a media system although system 100 is not limited to this context. For example, system 1000 may be incorporated into a digital still camera, digital video camera, mobile device with camera or video functions such as an imaging phone, webcam, personal computer (PC), laptop computer, ultra-laptop computer, tablet with multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In implementations, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas 1003, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, text ("texting") message, social media formats, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
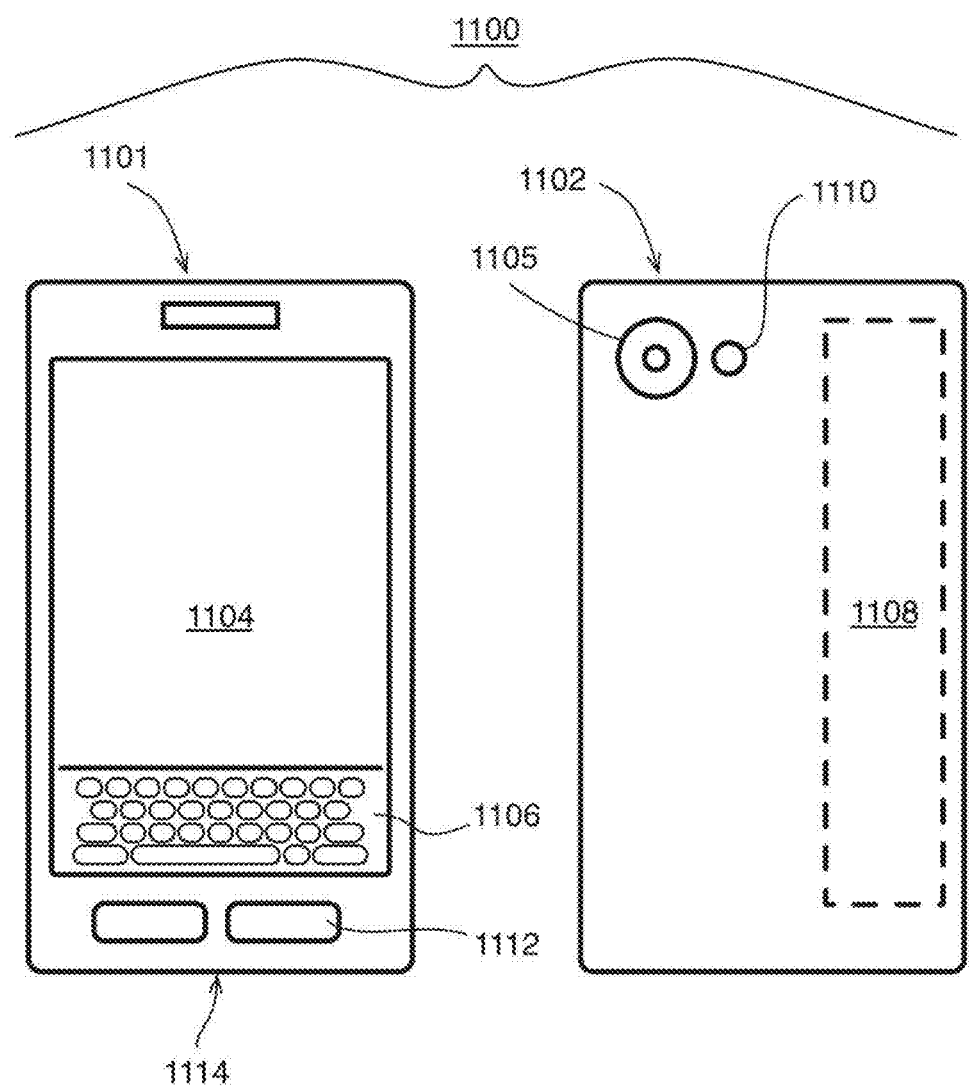
FIG. 11 illustrates another example device, all arranged in accordance with at least some implementations of the present disclosure.

Referring to FIG. 11, a small form factor device 1100 is one example of the varying physical styles or form factors in which systems 900 or 1000 may be embodied. By this approach, device 1100 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 106 may include an alphanumeric keyboard, a numeric keypad, a touch pad, input keys, buttons, switches, microphones, speakers, voice recognition device and software, and so forth. Information also may be entered into device 1100 by way of microphone 1114, or may be digitized by a voice recognition device. As shown, device 1100 may include a camera 1105 (e.g., including at least one lens, aperture, and imaging sensor) and an illuminator 1110, such as those described herein, integrated into back 1102 (or elsewhere) of device 1100. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example implementation, a computer-implemented computer-implemented method of object recognition for image processing, comprises obtaining image data of frames of a captured video sequence and including content of at least one object to be recognized and added to a neural network training database of objects in order to customize the neural network training database by including at least one desired object of a specific user; inputting the frames into a general knowledge neural network associated with a generic database to output a plurality of candidate masks associated with an instance of an object; customizing the training database by adding an added mask to the training database and that is a selected one of the plurality of candidate masks; inputting the frames into an instance segmentation neural network to output a segmentation mask; modifying the instance segmentation neural network to form a modified instance segmentation neural network wherein the modifying is based at least partially on at least one added mask in the training database; and performing object recognition during an inference run-time by using the modified instance segmentation neural network.

By another implementation, this method also may comprise determining a quality score of individual candidate masks by comparing the individual candidate masks to a segmentation mask output from the instance segmentation neural network; selecting a candidate mask to be an added mask that has the highest quality score and meets at least one threshold criteria; computing the quality score at least based on a color histogram comparison computing the quality score at least based on a Jaccard-related value: and locally adapting the instance segmentation neural network to the added masks from the training database depending on how close the frame of the added mask is to a current target frame being analyzed and along the video sequence, wherein the closer the frame of the added mask is to the current target frame, the more likely the instance segmentation neural network is to be adapted to the added mask, wherein added masks at the closest five frames to the current target frame has about a 70% chance of being used to adapt the instance segmentation neural network, while frames farther than the closest five frames have less of a chance of being used to adapt the instance segmentation neural network, wherein the frames farther than the closest five frames have an about 30% chance of being used to adapt the instance segmentation neural network. The method comprising globally adapting the instance segmentation neural network to the added masks of substantially each frame of the video sequence in addition to the local adaption so that the added masks of the local adaption are used more than once. The method also comprises adapting the instance segmentation neural network with supervised training by using the added masks from the training database as output to the instance segmentation neural network and a frame with the image data of a corresponding individual added mask as input to the instance segmentation neural network; wherein only one frame of the video sequence has annotation of one or more objects on the frame when being input to the general knowledge neural network; and wherein only one frame of the video sequence has annotation of one or more objects on the frame when being input to the instance segmentation neutral network.

By a further implementation, a computer-implemented system of at least one display; at least one memory; at least one processor communicatively coupled to the display and the memory, and to operate by: obtaining image data of frames of a captured video sequence and including content of at least one object to be recognized and added to a neural network training database of objects in order to customize the neural network training database by including at least one desired object of a specific user; inputting the frames into a general knowledge neural network associated with a generic database to output a plurality of candidate masks associated with an instance of an object; customizing the training database by adding an added mask to the training database and that is a selected one of the plurality of candidate masks; inputting the frames into an instance segmentation neural network to output a segmentation mask; modifying the instance segmentation neural network to form a modified instance segmentation neural network wherein the modifying is based at least partially on at least one added mask in the training database; and performing object recognition during an inference run-time by using the modified instance segmentation neural network.

The system also may include wherein the processor operates by receiving an activation from a user to initiate a customization setup mode that comprises the obtaining of the image data, inputting the frames into the general knowledge neural network and the instance segmentation neural network, and operating the mode to perform the modifying of the instance segmentation neural network; wherein the general knowledge neural network and instance segmentation neural network are cooperatively operated to analyze the same multiple frames of the video sequence to analyze one instance at a time so that the video sequence is analyzed repeatedly and at least once for each instance; wherein the video sequence is analyzed repeatedly for each instance to form multiple iterations adapting the instance segmentation neural network for each instance; wherein the processor is to operate by locally adapting the instance segmentation neural network when an individual frame is being analyzed and repeated for multiple frames during a single iteration, and globally adapting the instance segmentation neural network once at the end of each iteration, wherein locally adapting comprises adapting the instance segmentation neural network with added masks from the training database depending on the location of the frame of the added mask relative to a current target frame being analyzed and along the video sequence, and wherein globally adapting comprises adapting the instance segmentation neural network to an added mask of substantially each frame of the video sequence.

As another implementation, at least one non-transitory computer-readable medium has stored thereon instructions that when executed cause a computing device to operate by: obtaining image data of frames of a captured video sequence and including content of at least one object to be recognized and added to a neural network training database of objects in order to customize the neural network training database by including at least one desired object of a specific user; inputting the frames into a general knowledge neural network associated with a generic database to output a plurality of candidate masks associated with an instance of an object; customizing the training database by adding an added mask to the training database and that is a selected one of the plurality of candidate masks; inputting the frames into an instance segmentation neural network to output a segmentation mask; modifying the instance segmentation neural network to form a modified instance segmentation neural network wherein the modifying is based at least partially on at least one added mask in the training database; and performing object recognition during an inference run-time by using the modified instance segmentation neural network.

The instructions also may cause the computing device to include wherein the instructions cause the computing device to operate by adapting the instance segmentation neural network for multiple iterations and multiple frames of the video sequence at each iteration and for a single instance so that the instances are adapted to separately with each instance being analyzed, wherein the instructions cause the computing device to operate by: determining a quality score for each candidate mask by comparing an individual candidate mask to a segmentation mask output by the instance segmentation neural network; and locally and globally adapting the instance segmentation neural network to perform the modifying of the instance segmentation neural network, wherein locally adapting comprises adapting the instance segmentation neural network with added masks from the training database depending on the location of the frame of the added mask relative to a current target frame being analyzed and along the video sequence, and wherein globally adapting comprises adapting the instance segmentation neural network to an added mask of substantially each frame of the video sequence; and running the instance segmentation neural network during a run-time after a customization mode that customizes the instance segmentation neural network, and to output an instance segmentation mask of one instance of a frame, and repeated with each instance on the frame; and combining the output instance segmentation masks into a single frame-based mask.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of object recognition for image processing, comprising:
    obtaining image data of frames of a captured video sequence and including content of at least one object to be recognized and added to a neural network training database of objects in order to customize the neural network training database by including at least one desired object of a specific user;
    inputting the frames into a general knowledge neural network associated with a generic database to output a plurality of candidate masks associated with an instance of an object;

customizing the training database by adding an added mask to the training database and that is a selected one of the plurality of candidate masks;

inputting the frames into an instance segmentation neural network to output a segmentation mask;

modifying the instance segmentation neural network to form a modified instance segmentation neural network wherein the modifying is based at least partially on at least one added mask in the training database; and performing object recognition during an inference runtime by using the modified instance segmentation neural network.

2. The method of claim 1 comprising determining a quality score of individual candidate masks by comparing the individual candidate masks to a segmentation mask output from the instance segmentation neural network.

3. The method of claim 2 comprising selecting a candidate mask to be an added mask that has the highest quality score and meets at least one threshold criteria.

4. The method of claim 2 comprising computing the quality score at least based on a color histogram comparison.

5. The method of claim 2 comprising computing the quality score at least based on a Jaccard-related value.

6. The method of claim 1 comprising locally adapting the instance segmentation neural network to the added masks from the training database depending on how close the frame of the added mask is to a current target frame being analyzed and along the video sequence.

7. The method of claim 6 wherein the closer the frame of the added mask is to the current target frame, the more likely the instance segmentation neural network is to be adapted to the added mask.

8. The method of claim 6 wherein added masks at the closest five frames to the current target frame has about a 70% chance of being used to adapt the instance segmentation neural network, while frames farther than the closest five frames have less of a chance of being used to adapt the instance segmentation neural network.

9. The method of claim 8 wherein the frames farther than the closest five frames have an about 30% chance of being used to adapt the instance segmentation neural network.

10. The method of claim 6 comprising globally adapting the instance segmentation neural network to the added masks of substantially each frame of the video sequence in addition to the local adaption so that the added masks of the local adaption are used more than once.

11. The method of claim 1 comprising globally adapting the instance segmentation neural network to the added masks of substantially each frame of the video sequence.

12. The method of claim 1 comprising adapting the instance segmentation neural network with supervised training by using the added masks from the training database as output to the instance segmentation neural network and a frame with the image data of a corresponding individual added mask as input to the instance segmentation neural network.

13. The method of claim 1 wherein only one frame of the video sequence has annotation of one or more objects on the frame when being input to the general knowledge neural network.

14. The method of claim 1 wherein only one frame of the video sequence has annotation of one or more objects on the frame when being input to the instance segmentation neutral network.

15. A computer-implemented system of semantic segmentation for image processing, comprising:
at least one display;
at least one memory
at least one processor communicatively coupled to the display and the memory, and to operate by:
obtaining image data of frames of a captured video sequence and including content of at least one object to be recognized and added to a neural network training database of objects in order to customize the neural network training database by including at least one desired object of a specific user;
inputting the frames into a general knowledge neural network associated with a generic database to output a plurality of candidate masks associated with an instance of an object;
customizing the training database by adding an added mask to the training database and that is a selected one of the plurality of candidate masks;
inputting the frames into an instance segmentation neural network to output a segmentation mask;
modifying the instance segmentation neural network to form a modified instance segmentation neural network wherein the modifying is based at least partially on at least one added mask in the training database; and
performing object recognition during an inference runtime by using the modified instance segmentation neural network.

16. The system of claim 15 wherein the processor operates by receiving an activation from a user to initiate a customization setup mode that comprises the obtaining of the image data, inputting the frames into the general knowledge neural network and the instance segmentation neural network, and operating the mode to perform the modifying of the instance segmentation neural network.

17. The system of claim 16 wherein the general knowledge neural network and instance segmentation neural network are cooperatively operated to analyze the same multiple frames of the video sequence to analyze one instance at a time so that the video sequence is analyzed repeatedly and at least once for each instance.

18. The system of claim 17 wherein the video sequence is analyzed repeatedly for each instance to form multiple iterations adapting the instance segmentation neural network for each instance.

19. The system of claim 18 wherein the processor is to operate by locally adapting the instance segmentation neural network when an individual frame is being analyzed and repeated for multiple frames during a single iteration, and globally adapting the instance segmentation neural network once at the end of each iteration, wherein locally adapting comprises adapting the instance segmentation neural network with added masks from the training database depending on the location of the frame of the added mask relative to a current target frame being analyzed and along the video sequence, and wherein globally adapting comprises adapting the instance segmentation neural network to an added mask of substantially each frame of the video sequence.

20. At least one non-transitory computer-readable medium having stored thereon instructions that when executed cause a computing device to operate by:
obtaining image data of frames of a captured video sequence and including content of at least one object to be recognized and added to a neural network training database of objects in order to customize the neural network training database by including at least one desired object of a specific user;

inputting the frames into a general knowledge neural network associated with a generic database to output a plurality of candidate masks associated with an instance of an object;

customizing the training database by adding an added mask to the training database and that is a selected one of the plurality of candidate masks;

inputting the frames into an instance segmentation neural network to output a segmentation mask;

modifying the instance segmentation neural network to form a modified instance segmentation neural network wherein the modifying is based at least partially on at least one added mask in the training database; and performing object recognition during an inference run-time by using the modified instance segmentation neural network.

21. The medium of claim 20 wherein the instructions cause the computing device to operate by adapting the instance segmentation neural network for multiple iterations and multiple frames of the video sequence at each iteration and for a single instance so that the instances are adapted to separately with each instance being analyzed.

22. The medium of claim 20 wherein the instructions cause the computing device to operate by:

determining a quality score for each candidate mask by comparing an individual candidate mask to a segmentation mask output by the instance segmentation neural network.

23. The medium of claim 22 wherein the instructions cause the computing device to operate by locally and globally adapting the instance segmentation neural network to perform the modifying of the instance segmentation neural network, wherein locally adapting comprises adapting the instance segmentation neural network with added masks from the training database depending on the location of the frame of the added mask relative to a current target frame being analyzed and along the video sequence, and wherein globally adapting comprises adapting the instance segmentation neural network to an added mask of substantially each frame of the video sequence.

24. The medium of claim 20 wherein the instructions cause the computing device to operate by running the instance segmentation neural network during a run-time after a customization mode that customizes the instance segmentation neural network, and to output an instance segmentation mask of one instance of a frame, and repeated with each instance on the frame; and combining the output instance segmentation masks into a single frame-based mask.

25. The medium of claim 20, wherein the instructions cause the computing device to operate by receiving an activation from a user to initiate a customization setup mode, wherein the customization mode comprises obtaining of the image data, inputting the frames into the general knowledge neural network and the instance segmentation neural network, and operating the mode to perform the modifying of the instance segmentation neural network.

* * * * *